US009484790B2

(12) United States Patent
Takahashi et al.

(10) Patent No.: US 9,484,790 B2
(45) Date of Patent: Nov. 1, 2016

(54) ROTOR FOR ELECTRIC ROTATING MACHINE AND METHOD OF MANUFACTURING THE SAME

(71) Applicant: DENSO CORPORATION, Kariya, Aichi-pref. (JP)

(72) Inventors: Yuki Takahashi, Obu (JP); Masahiro Seguchi, Obu (JP); Hideaki Suzuki, Toyoake (JP)

(73) Assignee: DENSO CORPORATION, Kariya (JP)

( * ) Notice: Subject to any disclaimer, the term of this patent is extended or adjusted under 35 U.S.C. 154(b) by 728 days.

(21) Appl. No.: 13/845,546

(22) Filed: Mar. 18, 2013

(65) Prior Publication Data
US 2013/0334910 A1  Dec. 19, 2013

(30) Foreign Application Priority Data
Jun. 13, 2012 (JP) ................................. 2012-133950

(51) Int. Cl.
| | |
|---|---|
| *H02K 1/27* | (2006.01) |
| *H02K 9/22* | (2006.01) |
| *H02K 15/03* | (2006.01) |
| H02K 15/12 | (2006.01) |

(52) U.S. Cl.
CPC .............. *H02K 9/22* (2013.01); *H02K 1/2766* (2013.01); *H02K 15/03* (2013.01); *H02K 15/12* (2013.01); *Y10T 29/49012* (2015.01)

(58) Field of Classification Search
CPC ... H02K 1/276; H02K 1/2766; H02K 1/2773
USPC ...................................... 310/156.53, 156.66
See application file for complete search history.

(56) References Cited

U.S. PATENT DOCUMENTS

| | | | |
|---|---|---|---|
| 7,518,277 B2* | 4/2009 | Nemoto | H02K 29/03 310/156.45 |
| 7,560,842 B2* | 7/2009 | Hattori | H02K 1/2766 310/156.53 |

(Continued)

FOREIGN PATENT DOCUMENTS

| | | |
|---|---|---|
| JP | 2002-034187 | 1/2002 |
| JP | 2004-023976 | 1/2004 |

(Continued)

OTHER PUBLICATIONS

English Machine Translation, Mizutani JP 2010-124559, Jun. 2010 https://www.j-platpat.inpit.go.jp/web/all/top/BTmTopEnglishPage.*

(Continued)

*Primary Examiner* — Burton Mullins
(74) *Attorney, Agent, or Firm* — Nixon & Vanderhye P.C.

(57) ABSTRACT

A rotor for an electric rotating machine includes a hollow cylindrical rotor core and a plurality of magnets. The rotor core has a plurality of magnet-receiving holes formed therein. Each of the magnet-receiving holes has a plurality of wall surfaces including a radially innermost wall surface which is positioned radially innermost among the plurality of wall surfaces. Each of the magnets is received in a corresponding one of the magnet-receiving holes of the rotor core. Further, each of the magnets is arranged in the corresponding magnet-receiving hole so that among the thermal resistances between the magnet and the plurality of wall surfaces of the corresponding magnet-receiving hole, the thermal resistance between the magnet and the radially innermost wall surface of the corresponding magnet-receiving hole is lowest.

23 Claims, 11 Drawing Sheets

(56) References Cited

U.S. PATENT DOCUMENTS

| | | | |
|---|---|---|---|
| 7,705,503 B2 * | 4/2010 | Takahashi | H02K 1/32 310/156.53 |
| 2006/0103253 A1 | 5/2006 | Shiga et al. | |
| 2006/0186752 A1 | 8/2006 | Matsumoto et al. | |
| 2009/0045689 A1 | 2/2009 | Haruno et al. | |
| 2009/0079287 A1 * | 3/2009 | Hattori | H02K 1/2766 310/156.53 |
| 2010/0083486 A1 | 4/2010 | Amano et al. | |
| 2011/0000079 A1 | 1/2011 | Fukumaru et al. | |
| 2011/0179633 A1 | 7/2011 | Amano et al. | |
| 2012/0091846 A1 * | 4/2012 | Nagai | H02K 15/03 310/156.01 |
| 2013/0334907 A1 | 12/2013 | Ikuta et al. | |

FOREIGN PATENT DOCUMENTS

| | | |
|---|---|---|
| JP | 2006-238584 | 9/2006 |
| JP | 2006-311730 | 11/2006 |
| JP | 2007-215301 | 8/2007 |
| JP | 2007-236019 | 9/2007 |
| JP | 2007-252014 | 9/2007 |
| JP | 2007-300754 | 11/2007 |
| JP | 2008-042967 | 2/2008 |
| JP | 2010-110049 | 5/2010 |
| JP | 2010-124559 | 6/2010 |
| JP | 2011-147323 | 7/2011 |
| JP | 2012-29524 | 2/2012 |
| JP | 2012-85433 | 4/2012 |
| JP | 2013-258850 | 12/2013 |

OTHER PUBLICATIONS

Office Action (3 pages) dated Nov. 25, 2014 issued in corresponding Japanese Application No. 2012-133950 and English translation (3 pages).

Office Action (3 pgs.) dated Apr. 17, 2014 issued in corresponding Japanese Application No. 2012-133950 with an at least partial English-language translation thereof (4 pgs.).

* cited by examiner

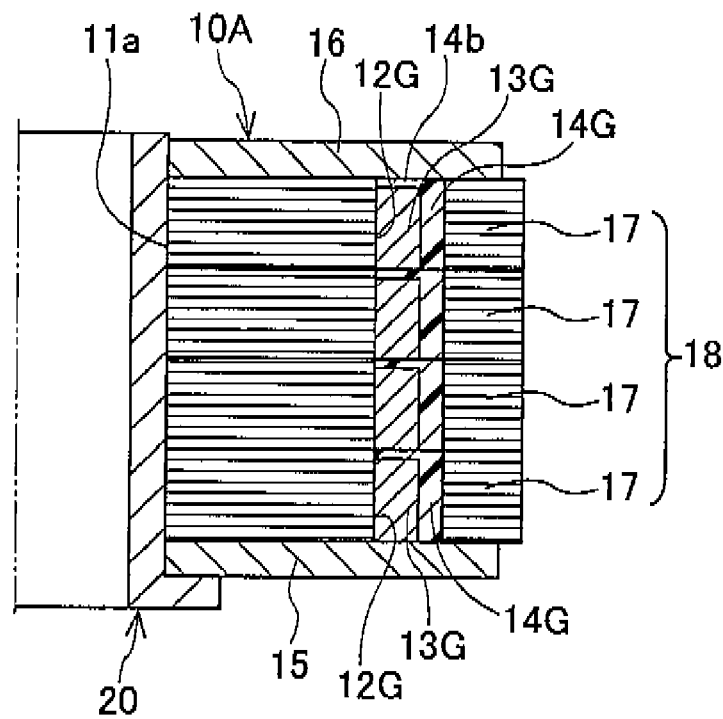
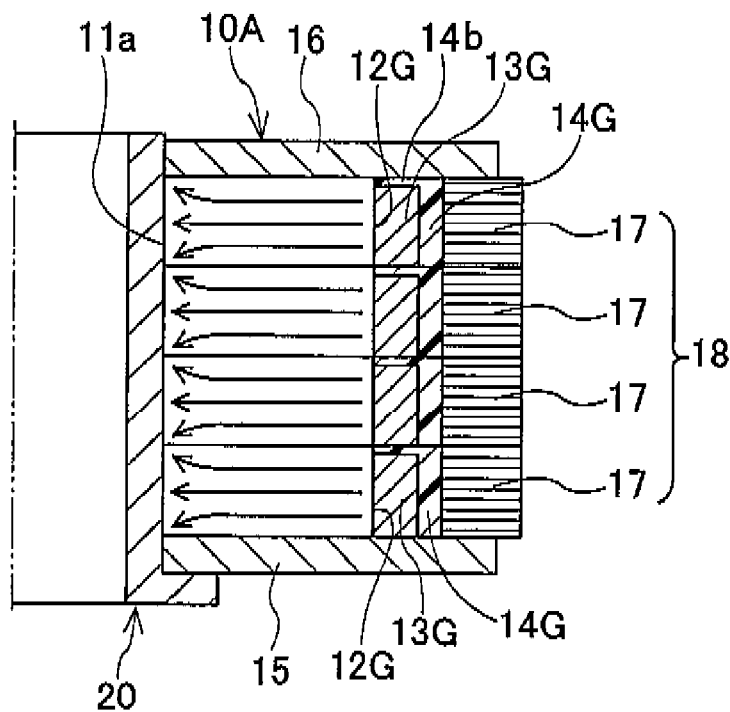

ROTOR FOR ELECTRIC ROTATING MACHINE AND METHOD OF MANUFACTURING THE SAME

CROSS-REFERENCE TO RELATED APPLICATION

This application is based on and claims priority from Japanese Patent Application No. 2012-133950, filed on Jun. 13, 2012, the content of which is hereby incorporated by reference in its entirety into this application.

BACKGROUND

1. Technical Field

The present invention relates to rotors for electric rotating machines that are used in, for example, motor vehicles as electric motors and electric generators, and to methods of manufacturing the rotors.

2. Description of Related Art

There is known, for example from Japanese Unexamined Patent Application Publication No. 2007-236019, a rotor for an electric rotating machine that is designed to be used in a motor vehicle. The rotor includes a rotor core, a plurality of magnets, a plurality of filler members and first and second end plates. The rotor core is fixed to a rotating shaft and has a plurality of magnet-receiving holes formed therein. Each of the magnets is received in a corresponding one of the magnet-receiving holes of the rotor core. Each of the filler members is provided in a corresponding one of the magnet-receiving holes of the rotor core to fill the void spaces unoccupied by the corresponding magnet. The first end plate is arranged on one axial side of the rotor core and fixed to the rotating shaft. The second end plate is arranged on the other axial side of the rotor core and fixed to the rotating shaft with a lower fixing strength than the first end plate.

Further, in the above rotor, the magnets are arranged in the corresponding magnet-receiving holes of the rotor core so as to be in direct contact with the first end plate while having the filler members interposed between the magnets and the second end plate. Consequently, with the direct contact between the magnets and the first end plate, heat generated by the magnets during operation can be removed from the magnets via the first end plate. As a result, the performance of the rotor for dissipating heat from the magnets can be improved.

In general, if the heat generated by the magnets during operation could not be sufficiently dissipated from the magnets, the magnetic force of the magnets would be lowered.

Therefore, it is desired to more effectively dissipate the heat generated by the magnets during operation from the magnets, thereby more reliably preventing the magnetic force of the magnets from being lowered.

SUMMARY

According to an exemplary embodiment, there is provided a rotor for an electric rotating machine which includes a hollow cylindrical rotor core and a plurality of magnets. The rotor core has a plurality of magnet-receiving holes formed therein. Each of the magnet-receiving holes has a plurality of wall surfaces including a radially innermost wall surface which is positioned radially innermost among the plurality of wall surfaces. Each of the magnets is received in a corresponding one of the magnet-receiving holes of the rotor core. Further, each of the magnets is arranged in the corresponding magnet-receiving hole so that among the thermal resistances between the magnet and the plurality of wall surfaces of the corresponding magnet-receiving hole, the thermal resistance between the magnet and the radially innermost wall surface of the corresponding magnet-receiving hole is lowest.

More particularly, in a further implementation, each of the magnets is retained by a corresponding retaining member in the corresponding magnet-receiving hole of the rotor core so as to abut the radially innermost wall surface of the corresponding magnet-receiving hole.

Consequently, heat generated by the magnets during operation can be first conducted from the magnets to the radially inner part of the rotor core, then conducted from the radially inner part of the rotor core to a rotating shaft that is disposed radially inside of the rotor core, and finally dissipated to the external environment from the outer surfaces of both axial end portions of the rotating shaft.

More specifically, when the rotor is disposed in the electric rotating machine radially inside of a stator, more magnetic fluxes will flow in the radially outer part of the rotor core during operation than in the radially inner part of the rotor core. Consequently, temperature will be higher at the radially outer part of the rotor core than at the radially inner part. Therefore, with the above configuration of the rotor, it is possible to effectively transmit the heat generated by the magnets during operation to the radially inner part, i.e., the low-temperature part of the rotor core. As a result, it is possible to secure high performance of the rotor for dissipating the heat generated by the magnets.

According to the exemplary embodiment, there is also provided a method of manufacturing the rotor. The method includes the steps of: providing each of the magnets in the corresponding magnet-receiving hole of the rotor core; and forming the corresponding retaining member for each of the magnets by filling a molten resin into the corresponding magnet-receiving hole and then solidifying the molting resin.

With the above method, it is possible to easily form the corresponding retaining member for each of the magnets. It is also possible to reliably ensure that the resultant corresponding retaining member retains the magnet in the corresponding magnet-receiving hole of the rotor core so as to abut the radially innermost wall surface of the corresponding magnet-receiving hole.

BRIEF DESCRIPTION OF THE DRAWINGS

The present invention will be understood more fully from the detailed description given hereinafter and from the accompanying drawings of exemplary embodiments, which, however, should not be taken to limit the invention to the specific embodiments but are for the purpose of explanation and understanding only.

In the accompanying drawings:

FIG. 7 is a cross-sectional view of a right half of a rotor according to a second embodiment, which is taken along the axial direction of the rotor;

FIG. 8 is a schematic view illustrating the dissipation of heat from permanent magnets in the rotor according to the second embodiment;

DESCRIPTION OF EMBODIMENTS

Figure 1:
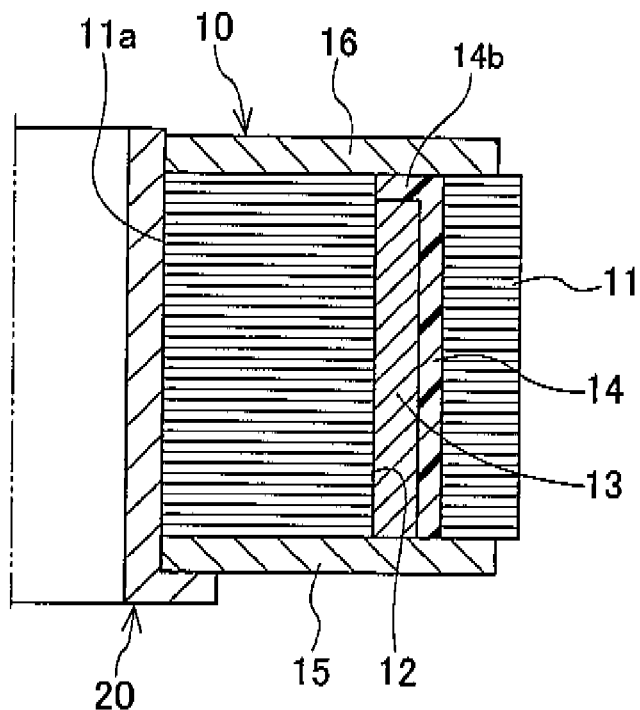
FIG. 1 is a cross-sectional view of a right half of a rotor according to a first embodiment, which is taken along the axial direction of the rotor.

Exemplary embodiments will be described hereinafter with reference to FIGS. 1-18. It should be noted that for the sake of clarity and understanding, identical components having identical functions throughout the whole description have been marked, where possible, with the same reference numerals in each of the figures and that for the sake of avoiding redundancy, descriptions of the identical components will not be repeated.

[First Embodiment]

FIG. 1 shows the overall configuration of a rotor 10 according to a first embodiment.

In this embodiment, the rotor 10 is designed to be used in, for example, an electric motor for a motor vehicle. More specifically, though not graphically shown, in the motor, the rotor 10 is to be received in a housing so as to be positioned radially inside of a hollow cylindrical stator. The motor has a rotating shaft 20 rotatably supported at both axial ends thereof by the housing via bearings. The rotor 10 is fixedly fitted on a radially outer surface of the rotating shaft 20 so as to rotate together with the rotating shaft 20.

As shown in FIG. 1, the rotor 10 includes: a rotor core 11 that is fixedly fitted on the radially outer surface of the rotating shaft 20 and has a plurality of magnet-receiving holes 12 formed therein; a plurality of permanent magnets 13 each of which is received in a corresponding one of the magnet-receiving holes 12 of the rotor core 11; a plurality of retaining members 14 each of which is formed of a resin filled in a corresponding one of the magnet-receiving holes 12 of the rotor core 11 so as to retain that corresponding one of the permanent magnets 13 which is received in the corresponding magnet-receiving hole 12; a first end plate 15 that is arranged on one axial side (i.e., the lower side in FIG. 1) of the rotor core 11 and fixed to the rotating shaft 20; and a second end plate 16 that is arranged on the other axial side (i.e., the upper side in FIG. 1) of the rotor core 11 and also fixed to the rotating shaft 20.

The rotor core 11 has a hollow cylindrical shape with a through-hole 11a formed at the radial center thereof. The rotor core 11 is formed of a plurality of annular magnetic steel sheets that are laminated in the axial direction of the rotor core 11. The rotor core 11 is fixed to the rotating shaft 20 by fitting the through-hole 11a to the radially outer surface of the rotating shaft 20.

Figure 3:
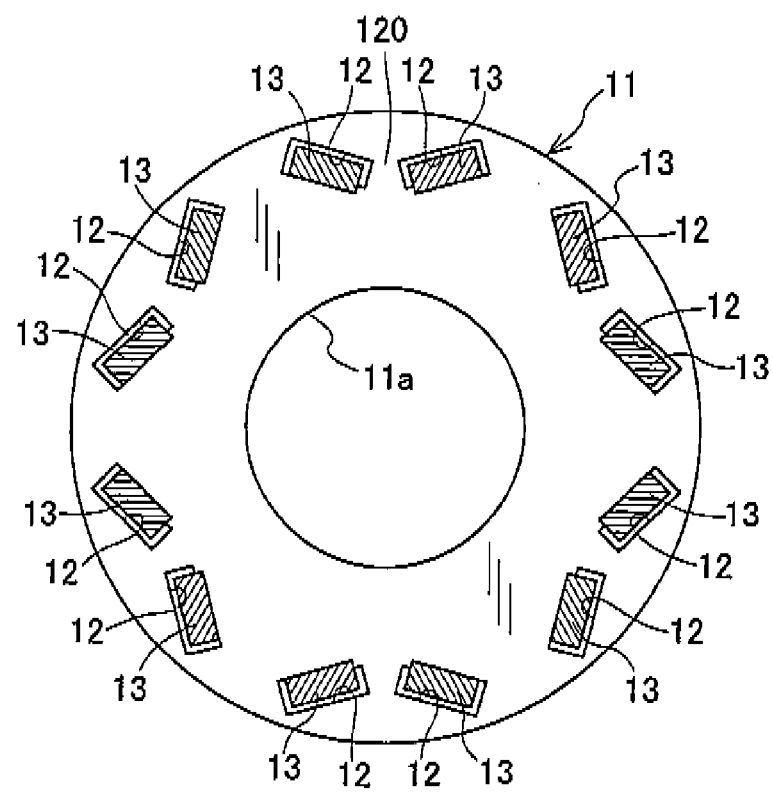
FIG. 3 is an axial end view of a rotor core of the rotor with the permanent magnets received in magnet-receiving holes of the rotor core.

Referring to FIG. 3, in the rotor core 11, the magnet-receiving holes 12 are formed in pairs in the vicinity of the radially outer periphery of the rotor core 11.

Each of the magnet-receiving holes 12 extends in the axial direction of the rotor core 11 so as to penetrate the rotor core 11 in the axial direction. Further, each of the magnet-receiving holes 12 has a substantially rectangular shape when viewed along the axial direction of the rotor core 11 (i.e., the direction perpendicular to the paper surface of FIGS. 3 and 4).

In the present embodiment, there are formed six pairs of the magnet-receiving holes 12 in the rotor core 11 so as to be spaced in the circumferential direction of the rotor core 11 at predetermined intervals. That is to say, the number of the magnet-receiving holes 12 formed in the rotor core 11 is equal to 12 in the present embodiment.

Each pair of the magnet-receiving holes 12 is arranged so as to form a substantially V-shape that opens toward the radially outer periphery of the rotor core 11. Moreover, for each pair of the magnet-receiving holes 12, there is formed a thin bridge portion 120 of the rotor core 11 to separate the two magnet-receiving holes 12 of the pair from each other. In addition, the bridge portion 120 is provided to impede formation of a magnetic circuit by causing magnetic flux saturation to occur in the bridge portion 120.

Figure 4:
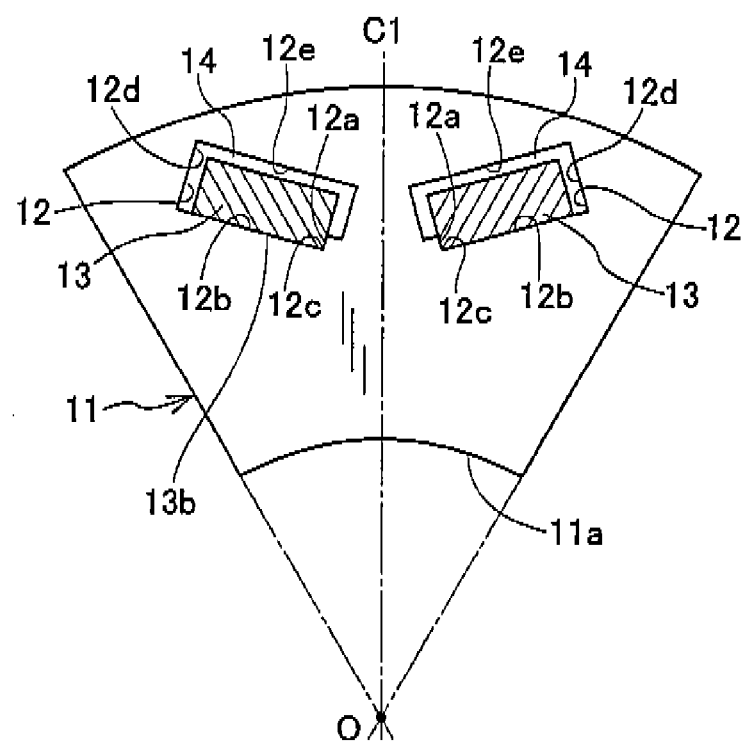
FIG. 4 is an enlarged view of part of FIG. 3 which corresponds to one magnetic pole of the rotor.

Referring further to FIG. 4, each of the permanent magnets 13 is inserted in the corresponding one of the magnet-receiving holes 12 of the rotor core 11 so as to extend in the axial direction of the rotor core 11. Further, each of the permanent magnets 13 has a rectangular cross section perpendicular to the axial direction of the rotor core 11 (i.e., the direction of a central axis O of the rotor core 11).

Moreover, for each pair of the magnet-receiving holes 12, the two permanent magnets 13 which are respectively inserted in the two magnet-receiving holes 12 of the pair are arranged so that the polarities (north or south) of the two permanent magnets 13 are the same on the radially outer periphery of the rotor core 11. Consequently, the two permanent magnets 13 together form one magnetic pole of the rotor 10 on the radially outer periphery of the rotor core 11.

Accordingly, in the present embodiment, the rotor 10 has a total of six magnetic poles (i.e., three north poles and three south poles) formed by the permanent magnets 13 on the radially outer periphery of the rotor core 11. Moreover, the six magnetic poles are arranged in the circumferential direction of the rotor core 11 so that the polarities of the magnetic poles alternate between north and south in the circumferential direction.

Furthermore, as shown in FIG. 4, when viewed along the axial direction of the rotor core 11, for each magnetic pole of the rotor 10, the two permanent magnets 13 which together form the magnetic pole are symmetrically arranged and extend obliquely with respect to a centerline C1 of the magnetic pole; the centerline C1 extends in a radial direction of the rotor core 11 to bisect the magnetic pole in the circumferential direction of the rotor core 11. Consequently, the two permanent magnets 13 together form a substantially V-shape that opens radially outward (i.e., toward the radially outer periphery of the rotor core 11).

Moreover, each of the magnet-receiving holes 12 of the rotor core 11 has a plurality of wall surfaces that together define the magnet-receiving hole 12.

More specifically, as shown in FIG. 4, each of the magnet-receiving holes 12 has a first wall surface 12a, a second wall surface 12b, a third wall surface 12d and a fourth wall surface 12e. Among the first to the fourth wall surfaces, the first wall surface 12a is positioned closest to the corresponding centerline C1; the second wall surface 12b is positioned radially innermost; the third wall surface 12d is positioned furthest from the corresponding centerline C1; and the fourth wall surface 12e is positioned opposite to the first wall surface 12a. The first wall surface 12a and the third wall surface 12d face each other in a direction oblique to the centerline C1. The second wall surface 12b and the fourth wall surface 12e face each other in a direction perpendicular to the direction in which the first wall surface 12a and the third wall surface 12d face each other. Further, in the present embodiment, the first wall surface 12a is stepped so that a corner portion 12c (to be referred to as "radially innermost corner portion 12c" hereinafter) between the first and second wall surfaces 12a and 12b protrudes from the remainder of the first wall surface 12a in a direction away from the corresponding centerline C1.

Figure 2:
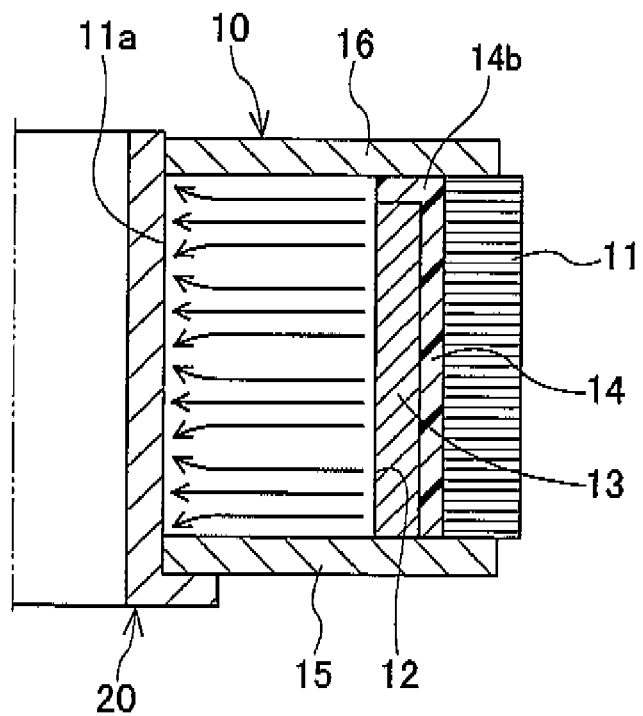
FIG. 2 is a schematic view illustrating the dissipation of heat from permanent magnets in the rotor.

Each of the permanent magnets 13 is retained in the corresponding magnet-receiving hole 12 of the rotor core 11 by the corresponding retaining member 14 so that a radially innermost corner portion of the permanent magnet 13 abuts the radially innermost corner portion 12c of the corresponding magnet-receiving hole 12. That is, the permanent magnet 13 abuts (or makes direct contact with) both the first and second wall surfaces 12a and 12b of the corresponding magnet-receiving hole 12. Consequently, as shown in FIG. 2, with the abutment between the permanent magnet 13 and the second wall surface 12b of the corresponding magnet-receiving hole 12b, heat generated by the permanent magnet 13 during operation can be effectively dissipated from the permanent magnet 13 to the radially inner part of the rotor core 11.

It should be noted that the permanent magnet 13 may either completely or partially abut the second wall surface 12b of the corresponding magnet-receiving hole 12.

More specifically, to maximize the amount of heat conducted between the permanent magnet 13 and the second wall surface 12b of the corresponding magnet-receiving hole 12, it is desirable for the permanent magnet 13 to completely abut the second wall surface 12b. In this case, the whole of a side surface 13b (see FIG. 4) of the permanent magnet 13, which faces the second wall surface 12b of the corresponding magnet-receiving hole 12, abuts the second wall surface 12b. However, as described previously, the rotor core 11 is formed by laminating the plurality of magnetic steel sheets. Therefore, in practice, due to the manufacturing tolerances, some of the magnetic steel sheets may be out of direct contact with the permanent magnet 13. Consequently, the permanent magnet 13 may only partially abut the second wall surface 12b of the corresponding magnet-receiving hole 12. In this case, only part of the side surface 13b of the permanent magnet 13 abuts the second wall surface 12b of the corresponding magnet-receiving hole 12.

In addition, in the latter case, the resin, which is filled into the corresponding magnet-receiving hole 12 to form the corresponding retaining member 14, may be leaked to fill the gap formed between the permanent magnet 13 and those of the magnetic steel sheets which are out of direct contact with the permanent magnet 13, thereby forming a very thin resin layer between the side surface 13b of the permanent magnet 13 and the second wall surface 12b of the corresponding magnet-receiving hole 12.

In the present embodiment, the rotor 10 is manufactured with a high degree of precision so that at least 70% of the side surface 13b of the permanent magnet 13 abuts the second wall surface 12b of the corresponding magnet-receiving hole 12.

Moreover, in the present embodiment, as shown in FIG. 3, when viewed along the axial direction of the rotor core 11, the permanent magnets 13 are received in the corresponding magnet-receiving holes 12 of the rotor core 11 at the same predetermined position relative to the corresponding magnet-receiving holes 12. Consequently, it is possible to prevent output variation and torque ripple of the motor due to different positions of the permanent magnets 13 relative to the corresponding magnet-receiving holes 12.

In the present embodiment, as shown in FIG. 1, the axial length (i.e., the length in the axial direction of the rotor core 11) of the permanent magnets 13 is set to be smaller than the axial length of the magnet-receiving holes 12 of the rotor core 11. Moreover, each of the permanent magnets 13 is inserted in the corresponding magnet-receiving hole 12 so that one axial end face (i.e., the lower end face) of the permanent magnet 13 is flush with one axial end face of the rotor core 11 and the other axial end face (i.e., the upper end face) of the permanent magnet 13 is recessed inward from the other axial end face of the rotor core 11. That is, the one axial end face of the permanent magnet 13 is exposed to the opening of the magnet-receiving hole 12 on the one axial end face of the rotor core 11.

After arranging each of the permanent magnets 13 at the predetermined position in the corresponding magnet-receiving hole 12, a molten resin is filled into the corresponding magnet-receiving hole 12 to occupy the void spaces formed between the permanent magnet 13 and the first, third and fourth wall surfaces 12a, 12d and 12e of the corresponding magnet-receiving hole 12 (see FIG. 4). Here, the major component of the molten resin is, for example, an epoxy resin. The molten resin is then solidified therein to form the corresponding retaining member 14 that retains the permanent magnet 13 in the corresponding magnet-receiving hole 12 so as to abut the second wall surface 12b of the corresponding magnet-receiving hole 12. That is, in the present embodiment, the corresponding retaining member 14 is formed as a resin mold that fixes the permanent magnet 13 received in the corresponding magnet-receiving hole 12 to the rotor core 11.

Moreover, during the formation of the corresponding retaining member 14, the molten resin is also filled into the void space formed between the other axial end faces of the permanent magnet 13 and the rotor core 11 (i.e., the upper end faces in FIG. 1), and solidified therein to form a corresponding filler member 14b. That is, in the present embodiment, the corresponding retaining member 14 and filler member 14b are integrally formed into one resin mold.

The first and second end plates 15 and 16, which are respectively arranged on opposite axial sides of the rotor core 11, are each formed of an iron-based metal plate into a ring shape. The first and second end plates 15 and 16 are fixed to the rotating shaft 20 by, for example, shrink-fitting those plates 15 and 16 onto the radially outer surface of the rotating shaft 20. In addition, the outer diameter of the first and second end plates 15 and 16 is set to be smaller than the outer diameter of the rotor core 11.

In the present embodiment, the first end plate 15 is arranged so as to abut the one axial end face (i.e., the lower end face in FIG. 1) of the rotor core 11. Consequently, the first end plate 15 is in direct contact with the permanent magnets 13 that are exposed to the openings of the corresponding magnet-receiving holes 12 on the one axial end face of the rotor core 11. Consequently, with the direct contact between the permanent magnets 13 and the first end plate 15, heat can be conducted from the permanent magnets 13 to the first end plate 15. On the other hand, the second end plate 16 is arranged so as to abut the other axial end face (i.e., the upper end face in FIG. 1) of the rotor core 11. Consequently, the second end plate 16 is in indirect contact with the permanent magnets 13 with the corresponding filler members 14b interposed between the second end plate 16 and the permanent magnets 13.

After having described the configuration of the rotor 10, a method of manufacturing it according to the present embodiment will be described hereinafter with reference to FIG. 6.

Figure 6:
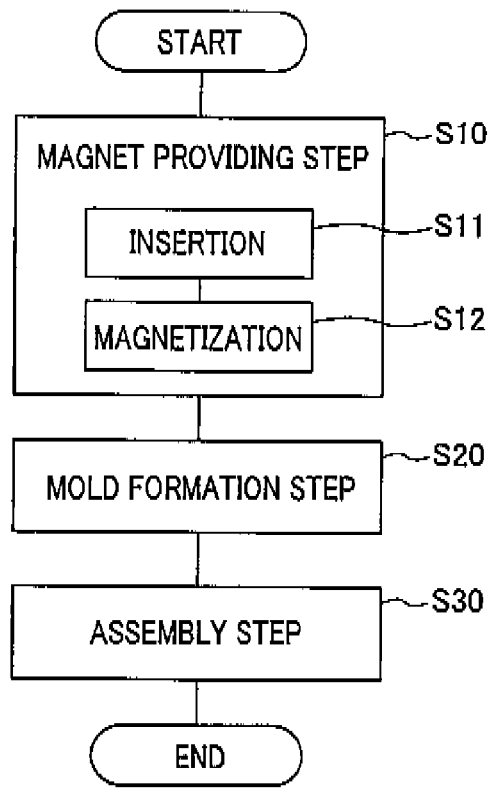
FIG. 6 is a flow chart illustrating a method of manufacturing the rotor according to the first embodiment.

In the present embodiment, as shown in FIG. 6, the method of manufacturing the rotor 10 includes a magnet providing step S10, a mold formation step S20 and an assembly step S30. Further, the magnet providing step S10 includes an insertion sub-step S11 and a magnetization sub-step S12.

In the magnet providing step S10, each of the permanent magnets 13 is provided in the corresponding magnet-receiving hole 12 of the rotor core 11.

Specifically, in the insertion sub-step S11 of the magnet providing step S10, each of a plurality of magnet material blocks is inserted into a corresponding one of the magnet-receiving holes 12 of the rotor core 11 so as to be located at the predetermined position in the corresponding magnet-receiving hole 12.

In addition, though not shown in FIG. 6, the method of manufacturing the rotor 10 further includes a preparing step, in which the rotor core 11, the first and second end plates 15 and 16, the magnet material blocks for forming the permanent magnets 13, the molten resin for forming the retaining and filler members 14 and 14b are prepared. The rotor core 11 is formed, as described previously, by laminating the magnetic steel sheets in the axial direction thereof. The magnet material blocks contain, for example, neodymium.

In the magnetization sub-step S12 of the magnet providing step S10, each of the magnet material blocks is magnetized by, for example, applying an external magnetic field using a magnetization coil until the magnet material block is magnetically saturated.

Consequently, the permanent magnets 13 are obtained each of which is located at the predetermined position in the corresponding magnet-receiving hole 12 of the rotor core 11.

In addition, in the magnetization sub-step S12, it is possible to make the magnet material block abut against the second wall surface 12b of the corresponding magnet-receiving hole 12. Consequently, it is possible to ease, for a mold forming apparatus used in the subsequent mold formation step S20, the devising of the mold forming apparatus for making the resultant permanent magnet 13 abut against the second wall surface 12b of the corresponding magnet-receiving hole 12.

In the mold formation step S20, for each of the permanent magnets 13, the resin mold, which includes the corresponding retaining and filler members 14 and 14b to the permanent magnet 13, is formed using a mold forming apparatus such as an injection molding apparatus or a transfer molding apparatus.

Specifically, in this step, the molten resin is filled into the corresponding magnet-receiving hole 12 of the rotor core 11 to occupy all the void spaces formed between the permanent magnet 13 and the first, third and fourth wall surfaces 12a, 12d and 12e of the corresponding magnet-receiving hole 12 (see FIG. 4) and the void space formed between the other axial end faces of the permanent magnet 13 and the rotor core 11 (i.e., the upper end faces in FIG. 1). Then, the molten resin is solidified in the corresponding magnet-receiving hole 12, forming the resin mold that includes the corresponding retaining and filler members 14 and 14b.

In addition, in this step, the molten resin is filled into the corresponding magnet-receiving hole 12 from the void space formed between the permanent magnet 13 and the fourth wall surface 12e (i.e., the wall surface opposite to the second wall surface 12b) of the corresponding magnet-receiving hole 12, so as to allow the resultant corresponding retaining member 14 to retain the permanent magnet 13 such that the permanent magnet 13 abuts the second wall surface 12b (i.e., the radially innermost wall surface) of the corresponding magnet-receiving hole 12.

It should be noted that the molten resin may also be filled into the corresponding magnet-receiving hole 12 with a fixing pin (not shown) inserted in the void space formed between the permanent magnet 13 and the fourth wall surface 12e of the corresponding magnet-receiving hole 12 so as to fix the permanent magnet 13 in abutment with the second wall surface 12b of the corresponding magnet-receiving hole 12.

In the assembly step S30, the rotor core 11, which has the permanent magnets 13 received in the corresponding magnet-receiving holes 12 and the resin molds formed in the corresponding magnet-receiving holes 12, and the first and second end plates 15 and 16 are assembled to the rotating shaft 20.

As a result, the rotor 10 as shown in FIG. 1 is obtained.

According to the present embodiment, it is possible to achieve the following advantageous effects.

In the present embodiment, the rotor 10 includes the hollow cylindrical rotor core 11 and the permanent magnets 13. The rotor core 11 has the magnet-receiving holes 12 formed therein. Each of the magnet-receiving holes 12 has the first to the fourth wall surfaces including the second wall surface 12b which is positioned radially innermost among the wall surfaces. Each of the permanent magnets 13 is received in the corresponding one of the magnet-receiving holes 12 of the rotor core 11. Further, each of the permanent magnets 13 is arranged in the corresponding magnet-receiving hole 12 so that among the thermal resistances between the permanent magnet 13 and the wall surfaces of the corresponding magnet-receiving hole 12, the thermal resistance between the permanent magnet 13 and the second wall surface 12b of the corresponding magnet-receiving hole 12 is lowest. More particularly, in the present embodiment, each of the permanent magnets 13 is retained by the corresponding retaining member 14 in the corresponding magnet-receiving hole 12 of the rotor core 11 so as to abut the second wall surface 12b of the corresponding magnet-receiving hole 12.

With the above configuration, heat generated by the permanent magnets 13 during operation can be first conducted from the permanent magnets 13 to the radially inner part of the rotor core 11, then conducted from the radially inner part of the rotor core 11 to the rotating shaft 20, and finally dissipated to the external environment from the outer surfaces of both axial end portions of the rotating shaft 20.

More specifically, since the rotor 10 is to be disposed in the motor radially inside of the stator, more magnetic fluxes will flow in the radially outer part of the rotor core 11 during operation than in the radially inner part of the rotor core 11. Consequently, temperature will be higher at the radially outer part of the rotor core 11 than at the radially inner part. Therefore, with the above configuration of the rotor 10, it is possible to effectively transmit the heat generated by the permanent magnets 13 during operation to the radially inner part, i.e., the low-temperature part of the rotor core 11. As a result, it is possible to secure high performance of the rotor 10 for dissipating the heat generated by the permanent magnets 13.

In the present embodiment, for each of the permanent magnets 13, the wail surfaces of the corresponding magnet-receiving hole 12 of the rotor core 11 Include the opposite pair of the first and third wall surfaces 12a and 12d which are respectively positioned on opposite circumferential sides of the second wall surface (i.e., the radially innermost wall surface) 12b and both adjoin the second wall surface 12b. Further, each of the permanent magnets 13 is retained by the corresponding retaining member 14 in the corresponding magnet-receiving hole 12 of the rotor core 11 so as to abut only one of the first and third wall surfaces 12a and 12d (i.e., the first wall surface 12a in the present embodiment) as well as the second wall surface 12b of the corresponding magnet-receiving hole 12.

Consequently, compared to the case of each of the permanent magnets 13 abutting both the first and third wall surfaces 12a and 12d, it is possible to more reliably prevent stress concentration from occurring in the rotor 10.

In the present embodiment, the magnet-receiving holes 12 are formed in pairs in the rotor core 11. For each pair of the magnet-receiving holes 12, the two permanent magnets 13 which are respectively received in the two magnet-receiving holes 12 of the pair are arranged so as to together form one magnetic pole of the rotor 10. When viewed along the axial direction of the rotor core 11, the two permanent magnets 13 are symmetrically arranged and extend obliquely with respect to the centerline C1 of the magnetic pole. For each of the permanent magnets 13, the corresponding magnet-receiving hole 12 of the rotor core 11 has the first wall surface 12a which is positioned closest to the centerline C1 and adjoins the second wall surface (i.e., the radially innermost wall surface) 12b with the radially innermost corner portion 12c formed therebetween. Each of the permanent magnets 13 is retained by the corresponding retaining member 14 in the corresponding magnet-receiving hole 12 so as to abut the radially innermost corner portion 12c of the corresponding magnet-receiving hole 12.

Consequently, each of the permanent magnets 13 is located in the corresponding magnet-receiving hole 12 at the predetermined position where unbalance variation due to uneven distribution of density in the permanent magnet 13 is smallest.

In the present embodiment, the permanent magnets 13 are received in the corresponding magnet-receiving holes 12 of the rotor core 11 at the same predetermined position relative to the corresponding magnet-receiving holes 12.

Consequently, it is possible to prevent output variation and torque ripple of the motor due to different positions of the permanent magnets 13 relative to the corresponding magnet-receiving holes 12.

In the present embodiment, each of the permanent magnets 13 has the side surface 13b that faces the second wall surface 12b of the corresponding magnet-receiving hole 12. Further, at least 70% of the side surface 13b of the permanent magnet 13 abuts the second wall surface 12b of the corresponding magnet-receiving hole 12.

Consequently, heat generated by each of the permanent magnets 13 during operation can be effectively dissipated via heat conduction between the permanent magnet 13 and the second wall surface 12b of the corresponding magnet-receiving hole 12.

Figure 5:
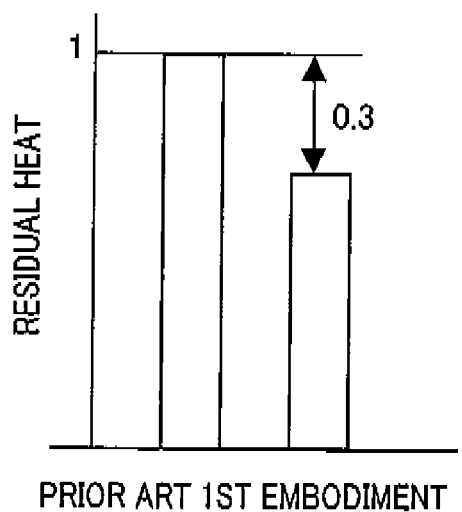
FIG. 5 is a graphical representation illustrating the heat-dissipating performance of the rotor according to the first embodiment in comparison with that of a conventional rotor.

FIG. 5 gives a comparison in heat-dissipating performance between the rotor 10 according to the present embodiment and the rotor known from Japanese Unexamined Patent Application Publication No. 2007-236019.

As described previously in the "Description of Related Art" section, in the known rotor, the heat generated by each of the magnets during operation is dissipated via heat conduction between the magnet and the first end plate. In comparison, in the rotor 10 according to the present embodiment, the heat generated by each of the permanent magnets 13 during operation is dissipated via heat conduction between the permanent magnet 13 and the second wall surface 12b of the corresponding magnet-receiving hole 12 as well as via heat conduction between the permanent magnet 13 and the first end plate 15.

Consequently, as shown in FIG. 5, the residual heat (or the remaining heat) in the rotor 10 according to the present embodiment is reduced by 30% in comparison with that in the known rotor.

In the present embodiment, the method of manufacturing the rotor 10 includes the magnet providing step S10 and the mold formation step S20. In the magnet providing step S10, each of the permanent magnets 13 is provided in the corresponding is magnet-receiving hole 12 of the rotor core 11 via the insertion and magnetization sub-steps S11 and 512. In the mold formation step S20, for each of the permanent magnets 13, the molten resin is filled into the corresponding magnet-receiving hole 12 of the rotor core 11 to occupy all the void spaces formed therein and then solidified, thereby forming the resin mold that includes the corresponding retaining and filler members 14 and 14b.

With the above method, it is possible to easily form the corresponding retaining member 14 for each of the permanent magnets 13. It is also possible to reliably ensure that the resultant corresponding retaining member 14 retains the permanent magnet 13 in the corresponding magnet-receiving hole 12 so as to abut the second wall surface 12b of the corresponding magnet-receiving hole 12.

[Second Embodiment]

This embodiment illustrates a rotor 10A which is similar in structure to the rotor 10 according to the first embodiment; accordingly, only the differences therebetween will be described hereinafter with reference to FIGS. 7-9.

As shown in FIG. 7, the rotor 10A according to the present embodiment includes an assembly 18 and the first and second end plates 15 and 16. The assembly 18 corresponds to the assembly of the rotor core 11, the permanent magnets 13 and the retaining members 14 in the first embodiment. However, in the present embodiment, the assembly 18 is comprised of a plurality (e.g., four) of sub-assemblies 17 that are stacked in the axial direction. The assembly 18 is fixedly fitted on the radially outer surface of the rotating shaft 20. The first end plate 15 is arranged on one axial side (i.e., the lower side in FIG. 7) of the assembly 18 and fixed to the rotating shaft 20. The second end plate 16 is arranged on the other axial side (i.e., the upper side in FIG. 7) of the assembly 18 and also fixed to the rotating shaft 20.

Moreover, each of the sub-assemblies 17 is formed by assembling a rotor core piece 11G, a plurality of permanent magnet pieces 13G and a plurality of retaining member pieces 14G into a predetermined state. The rotor core piece 11G is substantially equivalent to a quarter of the rotor core 11 in the first embodiment which is obtained by quadrisecting the rotor core 11 in the axial direction. Each of the permanent magnet pieces 13G is substantially equivalent to a quarter of one permanent magnet 13 in the first embodiment which is obtained by quadrisecting the permanent magnet 13 in the axial direction. Each of the retaining member pieces 14G is substantially equivalent to a quarter of one retaining member 14 in the first embodiment which is obtained by quadrisecting the retaining member 14 in the axial direction.

Accordingly, as in the first embodiment, the rotor core piece 11G has six pairs of magnet piece-receiving holes 12G formed in the vicinity of the radially outer periphery of the rotor core piece 11G. Each pair of the magnet piece-receiving holes 12G is arranged, as shown in FIG. 9, so as to form a substantially V-shape that opens toward the radially outer periphery of the rotor core piece 11G.

Each of the permanent magnet pieces 13G is received in a corresponding one of the magnet piece-receiving holes 12G of the rotor core piece 11G.

In the present embodiment, as shown in FIG. 7, the axial length of the permanent magnet pieces 13G is set to be smaller than the axial length of the magnet piece-receiving holes 12G of the rotor core piece 11G. Moreover, each of the permanent magnet pieces 13G is inserted in the corresponding magnet piece-receiving hole 12G so that one axial end face (i.e., the lower end face) of the permanent magnet piece 13G is flush with one axial end face of the rotor core piece 11G and the other axial end face (i.e., the upper end face) of the permanent magnet piece 13G is recessed inward from the other axial end face of the rotor core piece 11G. That is, the one axial end face of the permanent magnet piece 13G is exposed to the opening of the magnet piece-receiving hole 12G on the one axial end face of the rotor core piece 11G.

Figure 9:
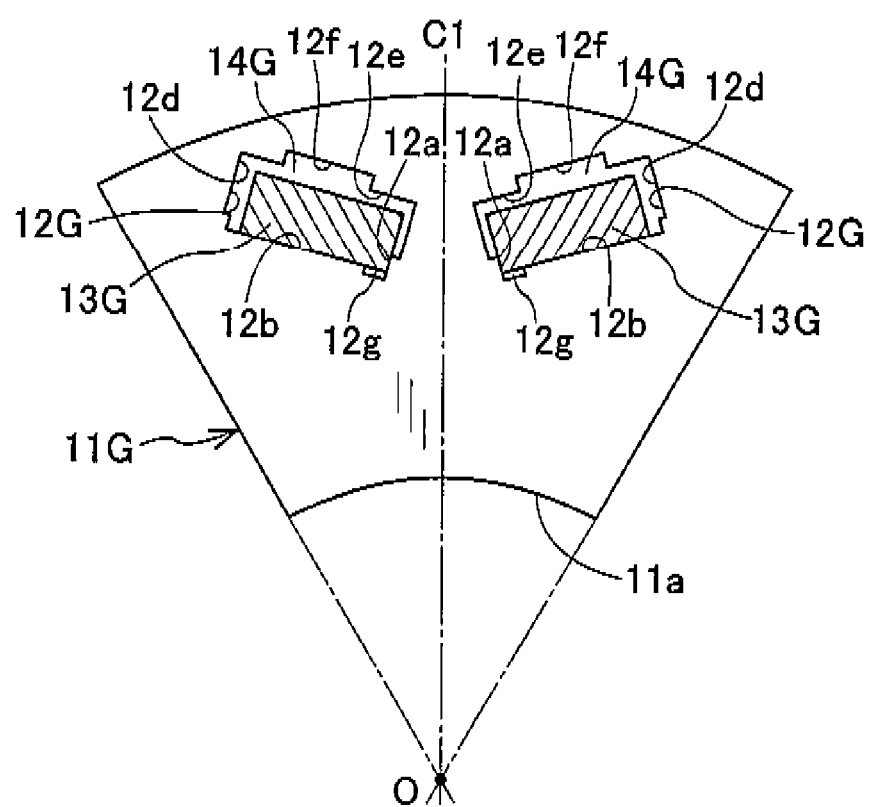
FIG. 9 is an enlarged axial end view of part of a rotor core piece in the rotor according to the second embodiment with permanent magnet pieces respectively retained by retaining member pieces in magnet piece-receiving holes of the rotor core piece.

Compared to the magnet-receiving holes 12 in the first embodiment, each of the magnet piece-receiving holes 12G in the present embodiment further has, as shown in FIG. 9, a groove 12f formed in the fourth wall surface 12e and a recess 12g formed in the second wall surface 12b of the magnet piece-receiving hale 12G.

More specifically, the groove 12f is formed in the fourth wall surface 12e at the center in the width direction thereof; it makes up a flow passage for the molten resin when the molten resin is filled into the magnet piece-receiving hole 12G. On the other hand, the recess 12g is formed in the second wall surface 12b at the centerline C1-side end thereof. Further, the recess 12g has a smaller cross-sectional area than the groove 12f.

Consequently, with the above groove 12f and recess 12g, when the molten resin is filled into the magnet piece-receiving hole 12G, the flow resistance on the radially outer side of the permanent magnet piece 13G is lowered, thereby allowing the molten resin to more easily flow into the void space formed on the radially outer side of the permanent magnet piece 13G to press the permanent magnet piece 13G toward the second wall surface 12b.

In the present embodiment, for each of the permanent magnet pieces 13G, the molten resin is filled into the corresponding magnet piece-receiving hole 12G of the rotor core piece 11G to occupy all the void spaces formed between the permanent magnet piece 13G and the wall surfaces 12a-12b and 12d-12e of the corresponding magnet piece-receiving hole 12G (see FIG. 9) and the void space formed between the other axial end faces of the permanent magnet piece 13G and the rotor core piece 11G (i.e., the upper end faces in FIG. 7). Then, the molten resin is solidified in the corresponding magnet piece-receiving hole 12G, forming the resin mold that includes the corresponding retaining member piece 14G and filler member 14b.

In the present embodiment, for each of the rotor core pieces 11G, the permanent magnet pieces 13G which are respectively received in the six pairs of magnet piece-receiving holes 12G of the rotor core piece 11G together form six magnetic poles (i.e., three north poles and three south poles) on the radially outer periphery of the rotor core piece 11G; the polarities of the six magnetic poles alternate between north and south in the circumferential direction of the rotor core piece 11G.

Moreover, each of the permanent magnet pieces 13G is retained by the corresponding retaining member piece 14G in the corresponding magnet piece-receiving hole 12G so as to abut the second wall surface 12b of the corresponding magnet piece-receiving hole 12G. Consequently, as shown in FIG. 8, with the abutment between the permanent magnet piece 13G and the second wall surface 12b of the corresponding magnet piece-receiving hole 12b, heat generated by the permanent magnet piece 13G during operation can be effectively dissipated from the permanent magnet piece 13G to the radially inner part of the rotor core piece 11G.

In the present embodiment, as shown in FIG. 7, all the four sub-assemblies 17 are identically oriented and stacked in the axial direction so as to overlap each other. More specifically, the four sub-assemblies 17 are identically oriented so that all those axial end faces of the rotor core pieces 11G on which the permanent magnet pieces 13G are exposed to the openings of the corresponding magnet piece-receiving holes 12G face toward the same side in the axial direction (i.e., face downward in FIG. 7). Consequently, in the resultant assembly 18, for that one of the sub-assemblies 17 which is positioned at one axial end (i.e., the lower end in FIG. 7) of the assembly 18, all the one axial end faces (i.e., the lower end faces in FIG. 7) of the rotor core piece 11G and permanent magnet pieces 13G of the sub-assembly 17 are in direct contact with the first end plate 15. On the other hand, for that one of the sub-assemblies 17 which is positioned at the other axial end (i.e., the upper end in FIG. 7), all the other axial end faces (i.e., the upper end faces in FIG. 7) of the rotor core piece 11G and filler members 14b of the sub-assembly 17 are in direct contact with the second end plate 16. That is, the permanent magnet pieces 13G of the sub-assembly 17 are in indirect contact with the second end plate 16 with the corresponding filler members 14b interposed therebetween.

After having described the configuration of the rotor 10A, a method of manufacturing it according to the present embodiment will be described hereinafter.

In the present embodiment, the method of manufacturing the rotor 10A also includes a magnet providing step S10, a mold formation step S20 and an assembly step S30 as shown in FIG. 6. Moreover, the magnet providing step S10 and the assembly step S30 of the method are similar to those of the method of manufacturing the rotor 10 according to the first embodiment. Accordingly, only the mold formation step S20 of the method according to the present embodiment will be described hereinafter with reference to FIGS. 10A-10D.

In the present embodiment, the mold formation step S20 is performed for each of the rotor core pieces 11G which have the corresponding permanent magnet pieces 13G respectively provided in the magnet piece-receiving holes 12G thereof.

Specifically, in the mold formation step S20, the rotor core piece 11G is first set to, for example, an injection molding apparatus.

Figure 10A:
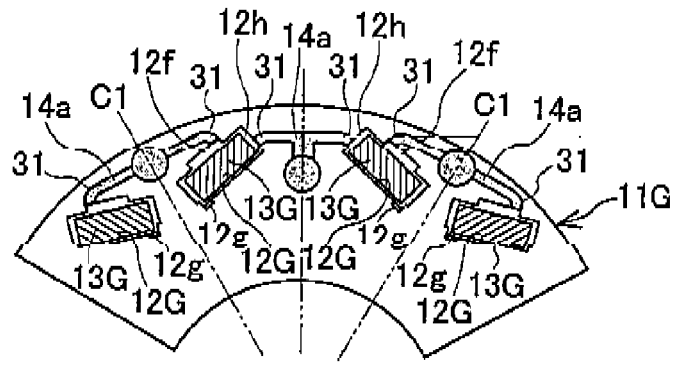
FIGS. 10A-10D are schematic views together illustrating a mold formation step of a method of manufacturing the rotor according to the second embodiment.

Specifically, as shown in FIG. 10A, the rotor core piece 11G is set to the injection molding apparatus so that for each of the magnet piece-receiving holes 12G of the rotor core piece 11G, there are arranged two injection gates 31 for injecting the molten resin 14a respectively into the groove 12f formed in the fourth wall surface 12e and the void space 12h formed between the permanent magnet piece 13G and the third wall surface 12d of the magnet piece-receiving hole 12G.

It should be noted that for the sake of simplicity, the injection gate 31 for injecting the molten resin 14a into the void space 12h is depicted in FIGS. 10A-10D only for the two magnet piece-receiving holes 12G centered in those figures.

Figure 10B:
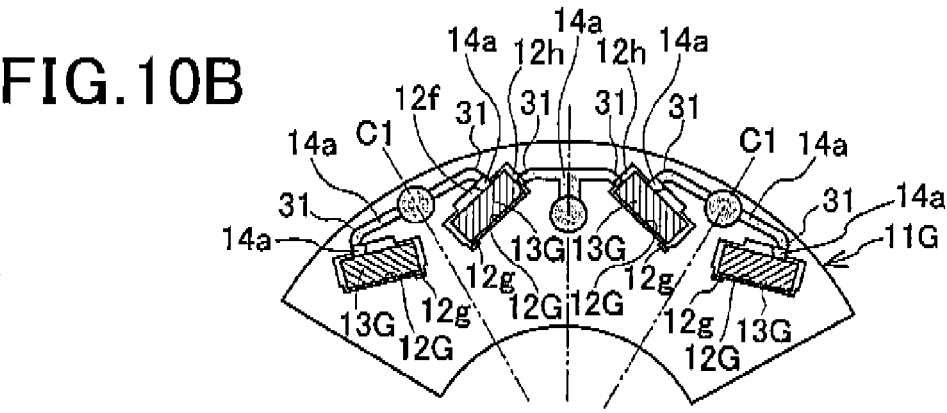
Figure 10C:
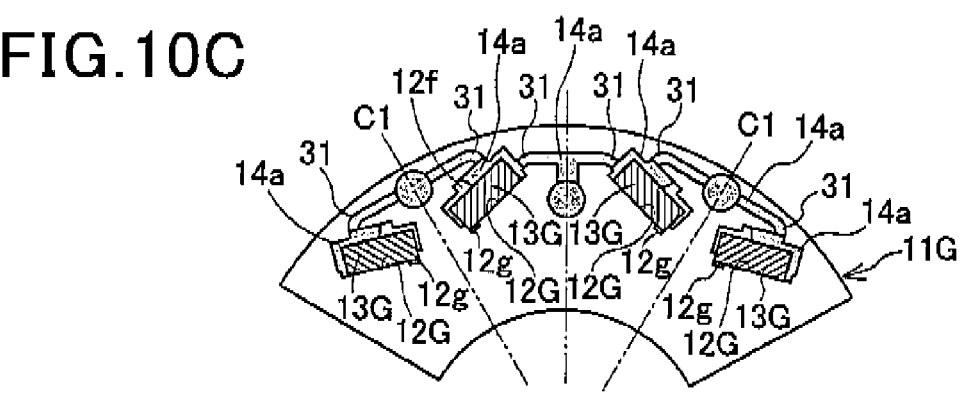

Then, the molten resin 14a is injected from the respective injection gates 31 into the groove 12f and the void space 12h. Consequently, as shown in FIGS. 10B and 10C, the molten resin 14a gradually occupies the groove 12f and the void space 12h, pressing the permanent magnet piece 13G toward both the first and second wall surfaces 12a and 12b of the magnet piece-receiving hole 12G, in other words, toward the radially innermost corner portion 12c formed between the first and second wall surfaces 12a and 12b.

Figure 10D:
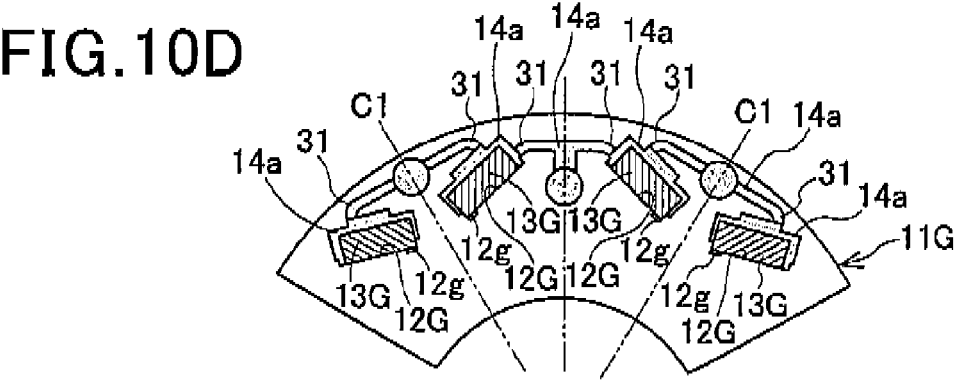

When all the void spaces formed in the magnet piece-receiving hole 12G are fully filled with the molten resin 14a, as shown in FIG. 10D, the permanent magnet piece 13G is brought into abutment with both the first and second wall surfaces 12a and 12b of the magnet piece-receiving hole 12G. Then, the injection of the molten resin 14a is stopped.

Thereafter, the molten resin 14a filled in all the magnet piece-receiving holes 12G of the rotor core piece 11G is solidified, forming the resin mold in each of the magnet piece-receiving holes 12G; the resin mold includes the corresponding retaining member piece 14G and filler member 14b.

After formation of the resin mold, the rotor core piece 11G is removed from the injection molding apparatus, completing the mold formation step S20.

According to the present embodiment, it is possible to achieve the same advantageous effects as described in the first embodiment. Moreover, it is also possible to achieve the following additional advantageous effects.

In the rotor 10A according to the present embodiment, the rotor core 11, the permanent magnets 13 and the retaining members 14 are together provided in the form of the assembly 18. The assembly 18 is comprised of the plurality of sub-assemblies 17 that are stacked in the axial direction of the rotor core 11. Each of the sub-assemblies 17 includes one of the rotor core pieces 11G and the permanent magnet pieces 13G each of which is retained in the corresponding magnet piece-receiving hole 12G of the rotor core piece 11G by the corresponding retaining member piece 14G.

With the above configuration, it is possible to facilitate the setting and modification of characteristics of the rotor 10A by changing the number of the sub-assemblies 17 and the manner of forming the sub-assemblies 17. Moreover, since each of the permanent magnets 13 is comprised of the plurality of permanent magnet pieces 13G, eddy-current loss occurring in each of the permanent magnets 13 can be reduced.

In the present embodiment, for each of the permanent magnet pieces 13G, the corresponding retaining member piece 14G is formed of the molten resin 14a filled in the corresponding magnet piece-receiving hole 12G. Moreover, the corresponding magnet piece-receiving hole 12G has both the groove 12f formed in the fourth wall surface 12e (i.e., the surface wall opposite to the second wall surface 12b) and the recess 12g formed in the second wall surface 12b (i.e., the radially innermost wall surface); the recess 12g has a smaller cross-sectional area than the groove 12f.

With the above configuration, when the molten resin 14a is filled into the corresponding magnet piece-receiving hole 12G, the flow resistance on the radially outer side of the permanent magnet piece 13G is lowered, thereby allowing the molten resin 14a to more easily flow into the void space formed on the radially outer side of the permanent magnet piece 13G to press the permanent magnet piece 13G toward the second wall surface 12b.

In the present embodiment, for each of the permanent magnet pieces 13G, the one axial end face (i.e., the lower end face in FIG. 7) of the permanent magnet piece 13G is exposed to the opening of the corresponding magnet piece-receiving hole 12G on the one axial end face of the rotor core piece 11G, and the other axial end face (i.e., the upper end face in FIG. 7) of the permanent magnet piece 13G Is recessed inward from the other axial end face of the rotor core piece 11G with the corresponding filler member 14b interposed between the other axial end faces of the permanent magnet piece 13G and the rotor core piece 11G. Moreover, the corresponding filler member 14b and the corresponding retaining member piece 14G are integrally formed of the molten resin 14a filled in the corresponding magnet piece-receiving hole 12G.

With the above configuration, for each of the permanent magnets 13, the permanent magnet pieces 13G which together make up the permanent magnet 13 can be insulated from each other by the corresponding filler members 14b interposed therebeween, thereby more effectively reducing the eddy-current loss occurring in the permanent magnet 13. Moreover, with the integral formation of the corresponding filler member 14b and the corresponding retaining member piece 14G, it is possible to improve the productivity of the rotor 10A.

In the present embodiment, all the sub-assemblies 17 are identically oriented and stacked in the axial direction of the rotor core 11 so as to overlap each other. Further, for that one of the sub-assemblies 17 which is positioned at the one axial end (i.e., the lower end in FIG. 7) of the assembly 18, all the permanent magnet pieces 13G of the sub-assembly 17 are exposed to outside of the assembly 18. On the other hand, for that one of the sub-assemblies 17 which is positioned at the other axial end (i.e., the upper end in FIG. 7) of the assembly 18, all the permanent magnet pieces 13G of the sub-assembly 17 are separated from outside of the assembly 18 by the corresponding filler members 14b.

With the above configuration, the permanent magnet pieces 13G of the sub-assembly 17 positioned at the one axial end of the assembly 18 are in direct contact with the first end plate 15. Consequently, heat generated by the permanent magnet pieces 13G during operation can be dissipated via heat conduction between the permanent magnet pieces 13G and the first end plate 15. On the other hand, the permanent magnet pieces 13G of the sub-assembly 17 positioned at the other axial end of the assembly 18 are in indirect contact with the second end plate 16 with the corresponding filler members 14b interposed therebetween. Consequently, when the motor includes an oil cooling system so that a coolant (e.g., ATF (Automatic Transmission Fluid)) flows (or undesirably intrudes) between the sub-assembly 17 positioned at the other axial end of the assembly 18 and the second end plate 16, the permanent magnet pieces 13 of the sub-assembly 17 are prevented from being exposed to the coolant. As a result, it is possible to prevent coatings that are formed on the surfaces of the permanent magnet pieces 13G from being deteriorated by the coolant.

In the present embodiment, in the mold formation step S20 of the method of manufacturing the rotor 10A, for each of the permanent magnet pieces 13G, the molten resin 14a is filled into the corresponding magnet piece-receiving hole 12G from the void space 12h formed between the permanent magnet piece 13G and the third wall surface 12d of the corresponding magnet piece-receiving hole 12G as well as from the groove 12f formed in the fourth wall surface 12e of the corresponding magnet piece-receiving hole 12G.

Consequently, during the filling of the molten resin 14a into the corresponding magnet piece-receiving hole 12G, it is possible for the flow of the molten resin 14a to press the permanent magnet piece 13G toward both the first and second wall surfaces 12a and 12b of the corresponding magnet piece-receiving hole 12G, in other words, toward the radially innermost corner portion 12c formed between the first and second wall surfaces 12a and 12b.

Figure 11:
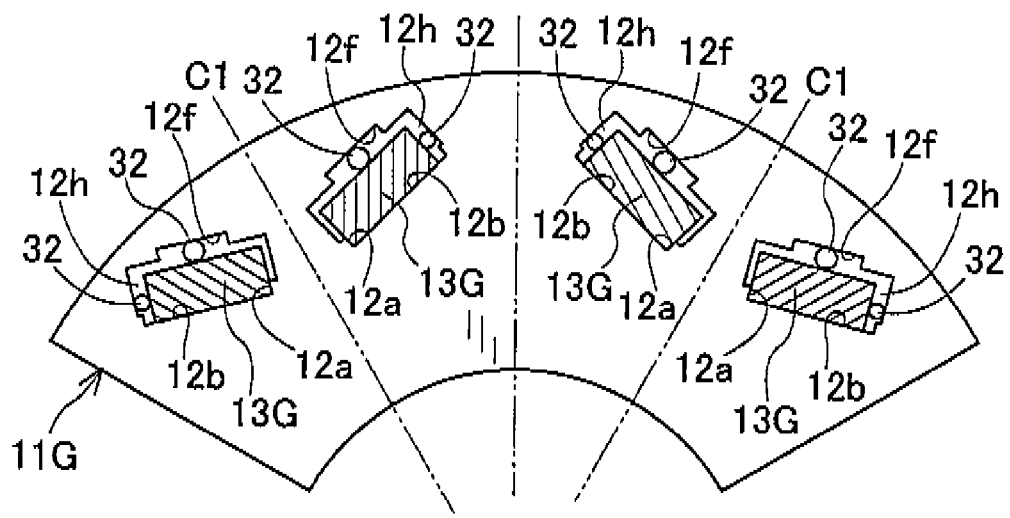
FIG. 11 is a schematic view illustrating a modification of the mold formation step of the method according to the second embodiment.

In addition, as shown in FIG. 11, in the mold formation step S20, for each of the permanent magnet pieces 13G, the molten resin 14a may also be filled into the corresponding magnet piece-receiving hole 12G with two fixing pins 32 respectively inserted in the groove 12f and the void space 12h so as to fix the permanent magnet piece 13G in abutment with both the first and second wall surfaces 12a and 12b of the corresponding magnet piece-receiving hole 12G. In this case, it is possible to more reliably ensure that the permanent magnet piece 13G abuts both the first and second wall surfaces 12a and 12b of the corresponding magnet piece-receiving hole 12G in the finally obtained rotor 10A.

Further, in the above case, it is also possible to form the injection gates 31 respectively in the fixing pins 32. Consequently, with the integral formation of the respective injection gates 31 and fixing pins 32, it is possible to perform both the setting of the injection gates 31 and the insertion of the fixing pins 32 at the same time, thereby improving the productivity of the rotor 10A.

[Modification 1]

In the rotor 10A according to the second embodiment, all the four sub-assemblies 17 are identically oriented and stacked in the axial direction so as to overlap each other.

Figure 12:
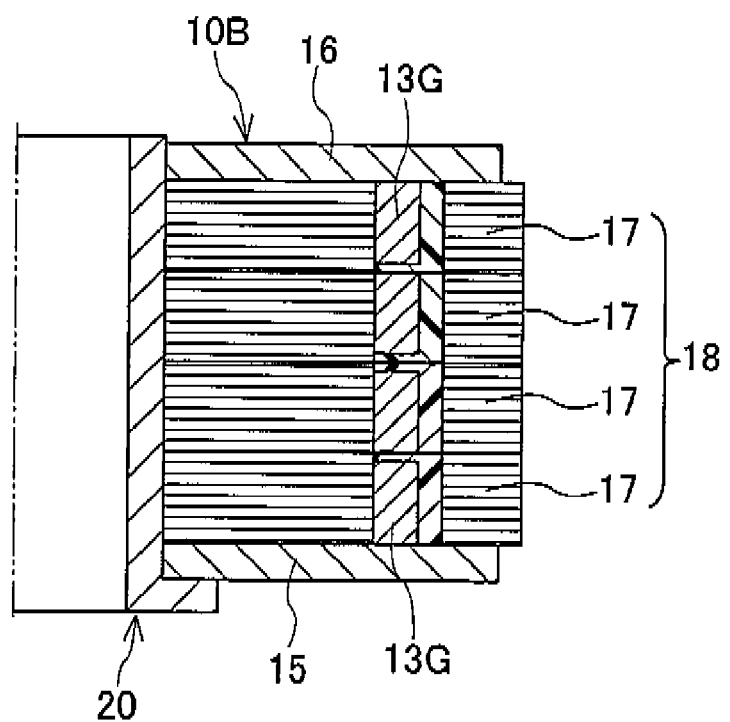
FIG. 12 is a cross-sectional view of a right half of a rotor according to one modification of the second embodiment, which is taken along the axial direction of the rotor.

In comparison, as shown in FIG. 12, in a rotor 10B according to one modification of the second embodiment, the orientation of the upper two sub-assemblies 17 are opposite to that of the lower two sub-assemblies 17.

More specifically, in this modification, the upper two sub-assemblies 17 are oriented so that those axial end faces of the rotor core pieces 11G on which the permanent magnet pieces 13G are exposed to the openings of the corresponding magnet piece-receiving holes 12G face upward. On the other hand, the lower two sub-assemblies 17 are oriented so that those axial end faces of the rotor core pieces 11G on which the permanent magnet pieces 13G are exposed to the openings of the corresponding magnet piece-receiving holes 12G face downward. That is, the two sub-assemblies 17 which are respectively positioned at opposite axial ends of the assembly 18 are respectively oriented toward opposite sides in the axial direction.

Consequently, in the resultant assembly 18, for that one of the sub-assemblies 17 which is positioned at one axial end (i.e., the lower end in FIG. 12) of the assembly 18, all the one axial end faces (i.e., the lower end faces in FIG. 12) of the permanent magnet pieces 13G of the sub-assembly 17 are exposed to outside of the assembly 18 and in direct contact with the first end plate 15. As a result, heat generated by the permanent magnet pieces 13G of the sub-assembly 17 positioned at the one axial end of the assembly 18 can be dissipated via heat conduction between the permanent magnet pieces 13G and the first end plate 15. On the other hand, for that one of the sub-assemblies 17 which is positioned at the other axial end (i.e., the upper end in FIG. 12), all the other axial end faces (i.e., the upper end faces in FIG. 12) of the permanent magnet pieces 13G of the sub-assembly 17 are exposed to outside of the assembly 18 and in direct contact with the second end plate 16. As a result, heat generated by the permanent magnet pieces 13G of the sub-assembly 17 positioned at the other axial end of the assembly 17 can be dissipated via heat conduction between the permanent magnet pieces 13G and the second end plate 16.

[Modification 2]

Figure 13:
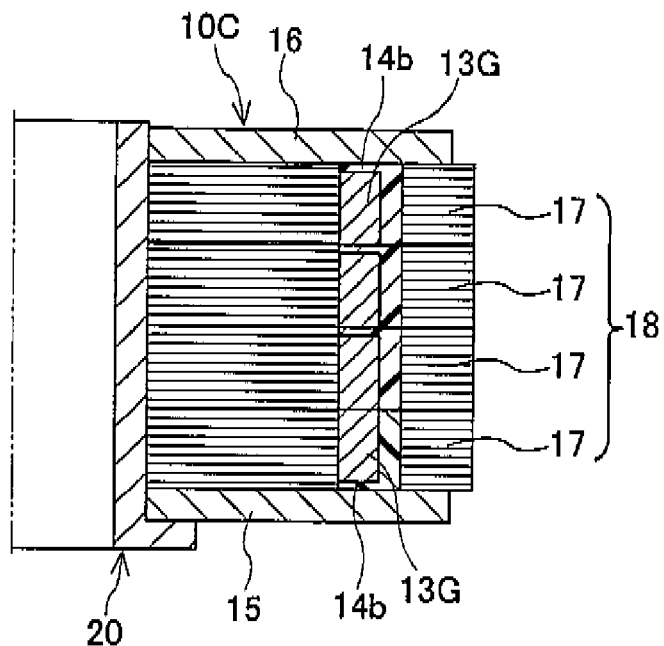
FIG. 13 is a cross-sectional view of a right half of a rotor according to another modification of the second embodiment, which is taken along the axial direction of the rotor.

FIG. 13 shows the configuration of a rotor 10C according to another modification of the second embodiment.

As shown FIG. 13, in this modification, the upper two sub-assemblies 17 are oriented so that those axial end faces of the rotor core pieces 11G on which the permanent magnet pieces 13G are exposed to the openings of the corresponding magnet piece-receiving holes 12G face downward. On the other hand, the lower two sub-assemblies 17 are oriented so that those axial end faces of the rotor core pieces 11G on which the permanent magnet pieces 13G are exposed to the openings of the corresponding magnet piece-receiving holes 12G face upward. That is, the two sub-assemblies 17 which are respectively positioned at opposite axial ends of the assembly 18 are respectively oriented toward opposite sides in the axial direction.

Consequently, in the resultant assembly 18, for that one of the sub-assemblies 17 which is positioned at one axial end (i.e., the lower end in FIG. 13) of the assembly 18, all the permanent magnet pieces 13G of the sub-assembly 17 are separated from outside of the assembly 18 by the corresponding filler members 14b and in indirect contact with the first end plate 15 with the corresponding filler members 14b interposed therebetween. On the other hand, for that one of the sub-assemblies 17 which is positioned at the other axial end (i.e., the upper end in FIG. 13), all the permanent magnet pieces 13G of the sub-assembly 17 are separated from outside of the assembly 18 by the corresponding filler members 14b and in indirect contact with the second end plate 16 with the corresponding filler members 14b interposed therebetween.

With the above configuration, when the motor includes an oil cooling system so that a coolant (e.g., ATF) flows (or undesirably intrudes) between the sub-assembly 17 positioned at the one axial end of the assembly 18 and the first end plate 15 and between the sub-assembly 17 positioned at the other axial end of the assembly 18 and the second end plate 16, the permanent magnet pieces 13 of those sub-assemblies 17 are prevented from being exposed to the coolant. Consequently, it is possible to prevent coatings that are formed on the surfaces of the permanent magnet pieces 13G from being deteriorated by the coolant.

[Third Embodiment]

This embodiment illustrates a rotor 10D which is similar in structure to the rotor 10A according to the second embodiment; accordingly, only the differences therebetween will be described hereinafter.

In the second embodiment, for each of the magnet piece-receiving holes 12G of the rotor core pieces 11G, there is only the single groove 12f formed in the fourth wall surface 12e of the magnet piece-receiving hole 12G (see FIG. 9).

Figure 14:
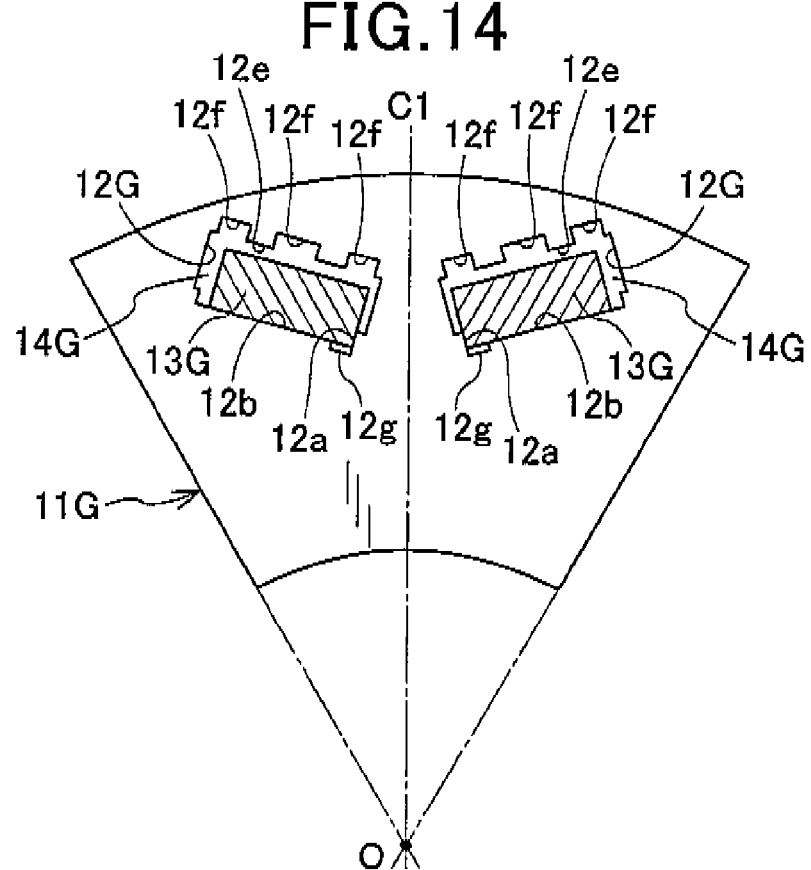
FIG. 14 is an enlarged axial end view of part of a rotor core piece in a rotor according to a third embodiment with permanent magnet pieces respectively retained by retaining member pieces in magnet piece-receiving holes of the rotor core piece.

In comparison, in the present embodiment, as shown in FIG. 14, for each of the magnet piece-receiving holes 12G of the rotor core pieces 11G, there are three grooves 12f formed in the fourth wall surface 12e of the magnet piece-receiving hole 12G. Those grooves 12f include a center groove 12f formed at the center of the fourth wall surface 12e in the width direction and a pair of side grooves 12f respectively formed at opposite ends of the fourth wall surface 12e in the width direction. In addition, all the three grooves 12f extend in the longitudinal direction of the fourth wall surface 12e (or in the axial direction of the rotor core 11) and spaced from one another in the width direction of the fourth wall surface 12e at predetermined intervals.

Next, a method of manufacturing the rotor 10D according to the present embodiment will be described.

In the present embodiment, the method of manufacturing the rotor 10D also includes a magnet providing step S10, a mold formation step S20 and an assembly step S30 as shown in FIG. 6. Moreover, the magnet providing step S10 and the assembly step S30 of the method are similar to those of the methods of manufacturing the rotors 10 and 10A according to the first and second embodiments. Accordingly, only the mold formation step S20 of the method according to the present embodiment will be described hereinafter with reference to FIGS. 15A-15D.

In the present embodiment, the mold formation step S20 is performed for each of the rotor core pieces 11G which have the corresponding permanent magnet pieces 13G respectively provided in the magnet piece-receiving holes 12G thereof. Specifically, in the mold formation step S20, the rotor core piece 11G is first set to, for example, an injection molding apparatus.

Figure 15A:
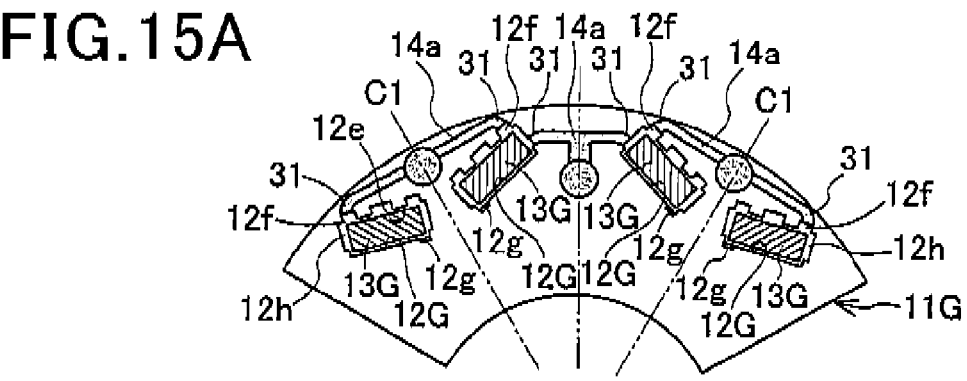
FIGS. 15A-15D are schematic views together illustrating a mold formation step of a method of manufacturing the rotor according to the third embodiment.

Specifically, as shown in FIG. 15A, the rotor core piece 11G is set to the injection molding apparatus so that for each of the magnet piece-receiving holes 12G of the rotor core piece 11G, there are arranged two injection gates 31 for injecting the molten resin 14a respectively into the void space 12h formed between the permanent magnet piece 13G and the third wall surface 12d and that side groove 12f which is positioned furthest from the centerline C1 among the three grooves 12f formed in the fourth wall surface 12e (i.e., the side groove 12f formed in the vicinity of the corner portion between the third and fourth wall surfaces 12d and 12e).

It should be noted that for the sake of simplicity, the injection gate 31 for injecting the molten resin 14a into the void space 12h is depicted in FIGS. 15A-15D only for the two magnet piece-receiving holes 12G centered in those figures.

Figure 15B:
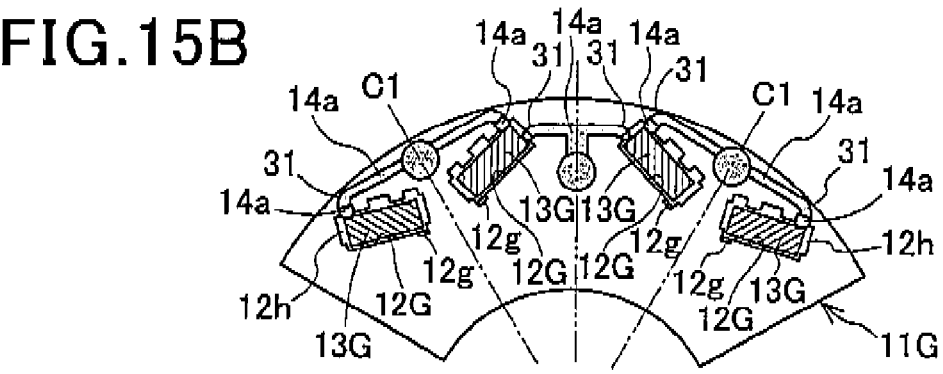
Figure 15C:
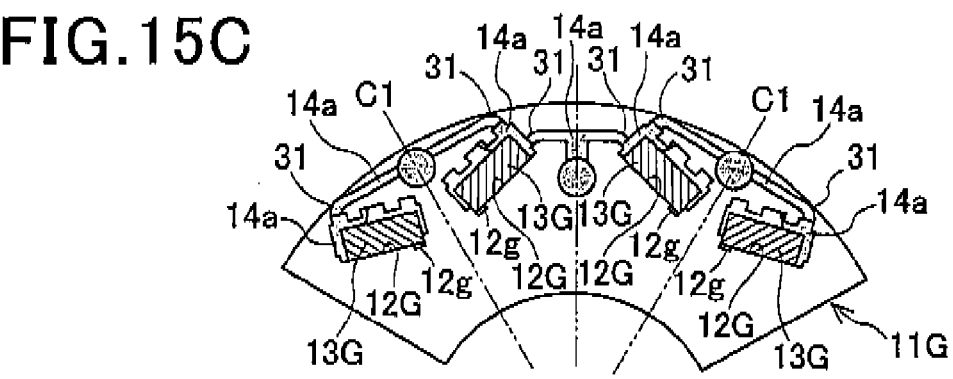

Then, the molten resin 14a is injected from the respective injection gates 31 into the void space 12h and the side groove 31. Consequently, as shown in FIGS. 15B and 15C, the molten resin 14a gradually occupies both the void space 12h formed between the permanent magnet piece 13G and the third wall surface 12d and the void space formed between the permanent magnet piece 13G and the fourth wall surface 12e, pressing the permanent magnet piece 13G toward both the first and second wall surfaces 12a and 12b of the magnet piece-receiving hole 12G, in other words, toward the radially innermost corner portion 12c formed between the first and second wall surfaces 12a and 12b.

Figure 15D:
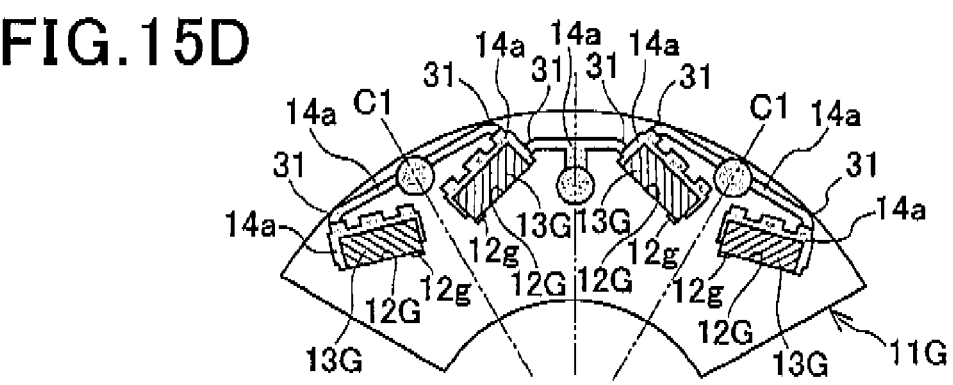

When all the void spaces formed in the magnet piece-receiving hole 12G are fully filled with the molten resin 14a, as shown in FIG. 15D, the permanent magnet piece 13G is brought into abutment with both the first and second wall surfaces 12a and 12b of the magnet piece-receiving hole 12G. Then, the injection of the molten resin 14a is stopped.

Thereafter, the molten resin 14a filled in all the magnet piece-receiving holes 12G of the rotor core piece 11G is solidified, forming the resin mold in each of the magnet piece-receiving holes 12G; the resin mold includes the corresponding retaining member piece 14G and filler member 14b.

After formation of the resin mold, the rotor core piece 11G is removed from the injection molding apparatus, completing the mold formation step S20.

According to the present embodiment, it is possible to achieve the same advantageous effects as described in the first and second embodiments. Moreover, it is also possible to achieve the following additional advantageous effects.

In the rotor 10D according to the present embodiment, each of the magnet piece-receiving holes 12G has the three grooves 12f formed in the fourth wall surface 12e thereof. Further, in the mold formation step S20 of the method of manufacturing the rotor 10D, the molten resin 14a is filled into both the void space 12h formed between the permanent magnet piece 13G and the third wall surface 12d of the magnet piece-receiving hole 12G and that side groove 12f which is positioned furthest from the centerline C1 among the three grooves 12f formed in the fourth wall surface 12e of the magnet piece-receiving hole 12G.

Consequently, compared to the method according to the second embodiment, it is possible for the flow of the molten resin 14a to more effectively press the permanent magnet piece 13G toward both the first and second wall surfaces 12a and 12b of the magnet piece-receiving hole 12G, in other words, toward the radially innermost corner portion 12c formed between the first and second wall surfaces 12a and 12b.

Figure 16:
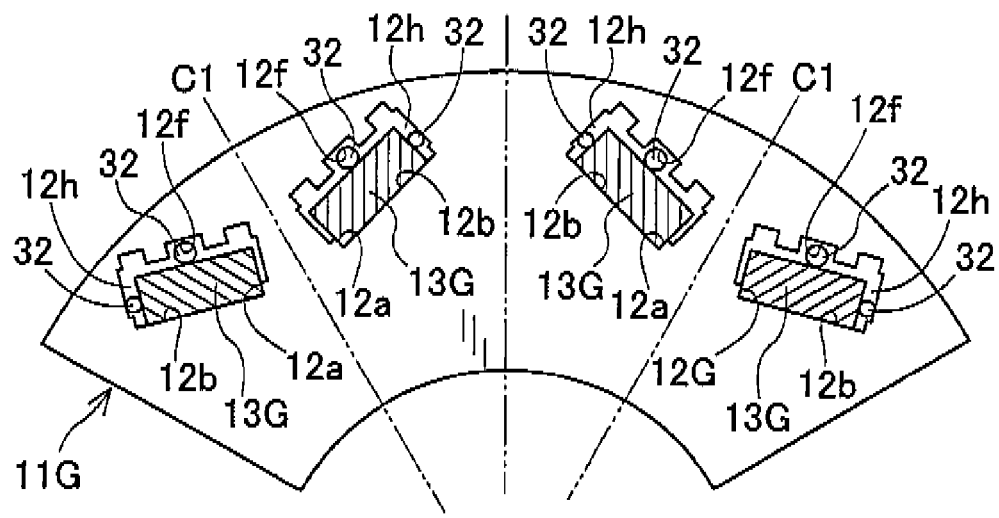
FIG. 16 is a schematic view illustrating a modification of the mold formation step of the method according to the third embodiment.

In addition, as shown in FIG. 16, in the mold formation step S20, for each of the permanent magnet pieces 13G, the molten resin 14a may also be filled into the corresponding magnet piece-receiving hole 12G with two fixing pins 32 respectively inserted in the center groove 12f and the void space 12h so as to fix the permanent magnet piece 13G in abutment with both the first and second wall surfaces 12a and 12b of the corresponding magnet piece-receiving hole 12G. In this case, it is possible to more reliably ensure that the permanent magnet piece 13G abuts both the first and second wall surfaces 12a and 12b of the corresponding magnet piece-receiving hole 12G in the finally obtained rotor 10D.

Further, in the above case, it is also possible to form the injection gates 31 respectively in the fixing pins 32. Consequently, with the integral formation of the respective injection gates 31 and fixing pins 32, it is possible to perform both the setting of the injection gates 31 and the insertion of the fixing pins 32 at the same time, thereby improving the productivity of the rotor 10D.

[Modification 3]

In the rotors according to the first to the third embodiments, each of the permanent magnets 13 (or permanent magnet pieces 13G) is retained by the corresponding retaining member 14 (or retaining member piece 14G) in the corresponding magnet-receiving hole 12 (or magnet piece-receiving hole 12G) so as to abut only the radially innermost corner portion 12c formed between the first and second wall surfaces 12a and 12b of the corresponding magnet-receiving hole 12 (see FIGS. 4, 9 and 14).

Figure 17:
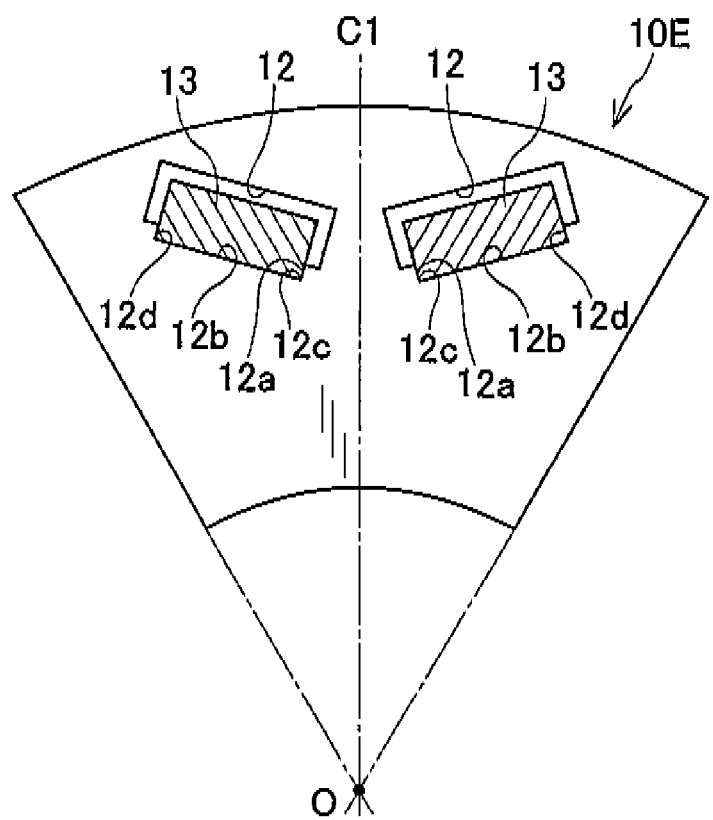
FIG. 17 is an enlarged axial end view of part of a rotor core in a rotor according to one modification of the first to the third embodiments with permanent magnets respectively received in magnet-receiving holes of the rotor core.

In comparison, as shown in FIG. 17, in a rotor 10E according to one modification of the embodiments, each of the permanent magnets 13 is centered in the width direction of the second wall surface 12b so as to abut the corner portion formed between the second and third wall surfaces 12b and 12d as well as the radially innermost corner portion 12c formed between the first and second wall surfaces 12a and 12b of the corresponding magnet-receiving hole 12.

With the above arrangement, it is possible to more accurately position each of the permanent magnets 13 in the corresponding magnet-receiving hole 12.

[Modification 4]

In the rotors according to the first to the third embodiments, the magnet-receiving holes 12 (or magnet piece-receiving holes 12G) are formed in pairs in the rotor core 11 (or rotor core pieces 11G); each pair of the magnet-receiving holes 12 is arranged so as to form the substantially V-shape that opens toward the radially outer periphery of the rotor core 11; for each pair of the magnet-receiving holes 12, the two permanent magnets 13 (or permanent magnet pieces 13G) which are respectively received in the two magnet-receiving holes 12 of the pair together form one magnetic pole on the radially outer periphery of the rotor core 11 (see FIGS. 4, 9 and 14).

Figure 18:
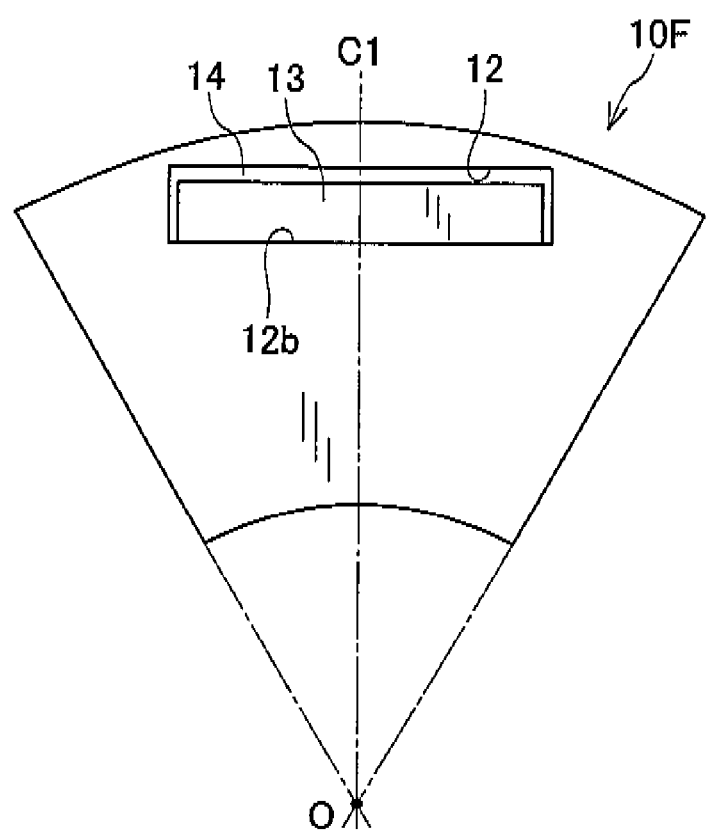
FIG. 18 is an enlarged axial end view of part of a rotor core in a rotor according to another modification of the first to the third embodiments with a permanent magnet received in a magnet-receiving hole of the rotor core.

In comparison, as shown in FIG. 18, in a rotor 10F according to another modification of the embodiments, the magnet-receiving holes 12 are individually formed in the rotor core 11. Further, each of the magnet-receiving holes 12 is arranged so as to extend perpendicular to a radial direction of the rotor core 11. For each of the magnet-receiving holes 12, the permanent magnet 13 received in the magnet-receiving hole 12 forms one magnetic pole by itself on the radially outer periphery of the rotor core 11. Furthermore, the permanent magnet 13 is retained by the retaining member 14 in the magnet-receiving hole 12 so as to abut the radially innermost wall surface 12b of the magnet-receiving hole 12.

In addition, the number of the magnetic poles formed in the rotor 10F according to this modification may be equal to 4, while the number of the magnetic poles formed in the rotors according to the first to the third embodiments is equal to 6.

While the above particular embodiments and modifications have been shown and described, it will be understood by those skilled in the art that various further modifications, changes, and improvements may be made without departing from the spirit of the invention.

(1) In the previous embodiments, each of the permanent magnets 13 (or permanent magnet pieces 13G) is retained by the corresponding retaining member 14 (or retaining member piece 14G) in the corresponding magnet-receiving hole 12 (or magnet piece-receiving hole 12G) so as to abut the first and second wall surfaces 12a and 12b of the corresponding magnet-receiving hole 12.

However, each of the permanent magnets 13 may also be retained by the corresponding retaining member 14 in the corresponding magnet-receiving hole 12 such that it is completely surrounded by the corresponding retaining member 14 and thus out of direct contact with all the wall surfaces of the corresponding magnet-receiving hole 12. Moreover, in this case, the thickness of those portions of the corresponding retaining member 14 which are interposed between the permanent magnet 13 and the first and second wall surfaces 12a and 12b of the corresponding magnet-receiving hole 12 may be in the range of 0 to 100 μm, and the thicknesses of those portions of the corresponding retaining member 14 which are interposed between the permanent magnet 13 and the third and fourth wall surfaces 12d-12e may be in the range of 100 to 300 μm. Consequently, the thermal resistance between the permanent magnet 13 and the second wall surface 12b is lowest among the thermal resistances between the permanent magnet 13 and all the wall surfaces 12a-12b and 12d-12e of the corresponding magnet-receiving hole 12.

(2) In the previous embodiments, the main component of the molten resin for forming the resin mold is the epoxy resin.

However, the main component of the molten resin may alternatively be a polyester resin, a phenolic resin, or an LCP (Liquid Crystal Polymer) resin.

In addition, to prevent the permanent magnets 13 from being damaged by centrifugal force acting on them during rotation of the rotor, it is preferable for the material of the molten resin to have a larger coefficient of linear expansion than the material of the rotor core 11.

(3) In the previous embodiments, for each of the permanent magnets 13 (or permanent magnet pieces 13G), the corresponding retaining member 14 (or retaining member piece 14G) that retains the permanent magnet 13 in the corresponding magnet-receiving hole 12 (or magnet piece-receiving hole 12G) is formed by filling the molten resin into the corresponding magnet-receiving hole 12 and solidifying the same therein.

However, the corresponding retaining member 14 may alternatively be formed of a wedge member inserted in the void space formed between the permanent magnet 13 and the fourth wall surface 12e of the corresponding magnet-receiving hole 12 or an electrically-conductive adhesive thinly applied between the permanent magnet 13 and the second wall surface 12b of the corresponding magnet-receiving hole 12.

Further, the wedge member may be preferably made of a resin having a larger coefficient of linear expansion than the material of the rotor core 11, such as an epoxy resin, a silicone resin and an LCP resin.

On the other hand, the electrically-conductive adhesive may preferably be a silver-based adhesive or a silicon-based adhesive. Moreover, it is preferable for the electrically-conductive adhesive to be thinly applied at a thickness of, for example, 10 to 20 μm, so as not to impede heat conduction from the permanent magnet 13 to the rotor core 11.

(4) In the second and third embodiments, the assembly 18 is comprised of the four sub-assemblies 17.

However, the assembly 18 may also be comprised of n sub-assemblies 17, where n is an integer not equal to 4 and not less than 2. Accordingly, in this case, the rotor core 11 is comprised of n rotor core pieces 11G, each of the permanent magnets 13 is comprised of n permanent magnet pieces 13G, and each of the retaining members 14 is comprised of n retaining member pieces 14G.

(5) In the first to the third embodiments, each of the permanent magnets 13 (or permanent magnet pieces 13G) is retained by the corresponding retaining member 14 (or retaining member piece 14G) in the corresponding magnet-receiving hole 12 (or magnet piece-receiving hole 12G) so as to abut both the first and second wall surfaces 12a and 12b of the corresponding magnet-receiving hole 12 (see FIGS. 4, 9 and 14).

However, each of the permanent magnets 13 may also be retained by the corresponding retaining member 14 in the corresponding magnet-receiving hole 12 so as to abut only the second wall surface 12b and be positioned closer to the third wall surface 12d than to the first wall surface 12a.

(6) In the previous embodiments, the rotors are designed to be used in the motor for the motor vehicle.

However, the invention may also be applied to rotors for other electric rotating machines, such as electric generators and motor-generators that can function both as an electric motor and as an electric generator.

What is claimed is:

1. A rotor for an electric rotating machine, the rotor comprising:
    a hollow cylindrical rotor core having a plurality of magnet-receiving holes formed therein, each of the magnet-receiving holes having a plurality of wall surfaces including a radially innermost wall surface which is positioned radially innermost among the plurality of wall surfaces; and
    a plurality of magnets each of which is received in a corresponding one of the magnet-receiving holes of the rotor core,
    wherein each of the magnets is arranged in the corresponding magnet-receiving hole so that among thermal resistances between the magnet and the plurality of wall surfaces of the corresponding magnet-receiving hole, the thermal resistance between the magnet and the radially innermost wall surface of the corresponding magnet-receiving hole is lowest,
    wherein each of the magnets is retained by a corresponding retaining member in the corresponding magnet-receiving hole of the rotor core so as to abut the radially innermost wall surface of the corresponding magnet-receiving hole, and
    wherein the rotor core comprises n rotor core pieces, each of the magnets comprises n magnet pieces, and each of the retaining members corresponding to the magnets comprises n retaining member pieces, where n is an integer greater than or equal to 2,
    each of the rotor core pieces has formed therein a plurality of magnet piece-receiving holes each of which makes up part of one of the magnet-receiving holes of the rotor core,
    the rotor core, the magnets and the retaining members are together provided in the form of an assembly,
    the assembly comprises n sub-assemblies that are stacked in an axial direction of the rotor core,
    each of the sub-assemblies includes one of the rotor core pieces and a plurality of the magnet pieces each of which is retained in a corresponding one of the magnet piece-receiving holes of the rotor core piece by a corresponding one of the retaining member pieces.

2. The rotor as set forth in claim 1, wherein for each of the magnets, the corresponding retaining member is formed of a resin filled in the corresponding magnet-receiving hole of the rotor core.

3. The rotor as set forth in claim 1, wherein for each of the magnet pieces, the corresponding retaining member piece is formed of a resin filled in the corresponding magnet piece-receiving hole of the rotor core piece.

4. The rotor as set forth in claim 3, wherein each of the magnet piece-receiving holes of the rotor core pieces has a plurality of wall surfaces including a radially innermost wall surface that is positioned radially innermost among the plurality of wall surfaces and a wall surface that is positioned opposite to the radially innermost wall surface, and
    each of the magnet piece-receiving holes also has a groove formed in the wall surface opposite to the radially innermost wall surface and a recess formed in the radially innermost wall surface, the recess having a smaller cross-sectional area than the groove.

5. The rotor as set forth in claim 3, wherein for each of the magnet pieces, one axial end face of the magnet piece is exposed to an opening of the corresponding magnet piece-receiving hole on one axial end face of the rotor core piece, and the other axial end face of the magnet piece is recessed inward from the other axial end face of the rotor core piece with a corresponding filler member interposed between the other axial end faces of the magnet piece and the rotor core piece, and
    the corresponding filler member and the corresponding retaining member piece are integrally formed of the resin filled in the corresponding magnet piece-receiving hole of the rotor core piece.

6. The rotor as set forth in claim 5, wherein those two sub-assemblies which are respectively positioned at opposite axial ends of the assembly are respectively oriented toward opposite sides in the axial direction.

7. The rotor as set forth in claim 6, wherein all the magnet pieces of the two sub-assemblies respectively positioned at opposite axial ends of the assembly are exposed to outside of the assembly.

8. The rotor as set forth in claim 6, wherein all the magnet pieces of the two sub-assemblies respectively positioned at opposite axial ends of the assembly are separated from outside of the assembly by the corresponding filler members.

9. The rotor as set forth in claim 1, wherein the plurality of magnet-receiving holes are formed in pairs in the rotor core,
    for each pair of the magnet-receiving holes, the two magnets which are respectively received in the two magnet-receiving holes of the pair are arranged so as to together form one magnetic pole of the rotor,
    when viewed along an axial direction of the rotor core, the two magnets are symmetrically arranged and extend obliquely with respect to a centerline of the magnetic pole, the centerline extending in a radial direction of the rotor core to bisect the magnetic pole in a circumferential direction of the rotor core,
    for each of the magnets, the plurality of wall surfaces of the corresponding magnet-receiving hole further include a wall surface that is positioned closest to the centerline among the plurality of wall surfaces and adjoins the radially innermost wall surface with a radially innermost corner portion formed therebetween, and each of the magnets is retained by the corresponding retaining member in the corresponding magnet receiving hole so as to abut the radially innermost corner portion.

10. The rotor as set forth in claim 1, wherein the magnets are received in the corresponding magnet-receiving holes of the rotor core so that all of the relative positions of the magnets to the corresponding magnet-receiving holes are the same.

11. The rotor as set forth in claim 1, wherein each of the magnets has a side surface which faces the radially innermost wall surface of the corresponding magnet-receiving hole, and
at least 70% of the side surface abuts the radially innermost wall surface of the corresponding magnet-receiving hole.

12. A method of manufacturing the rotor as set forth in claim 1, the method comprising the steps of:
providing each of the magnets in the corresponding magnet-receiving hole of the rotor core; and
forming the corresponding retaining member for each of the magnets by filling a molten resin into the corresponding magnet-receiving hole and then solidifying the molting resin.

13. A rotor for an electric rotating machine, the rotor comprising:
a hollow cylindrical rotor core having a plurality of magnet-receiving holes formed therein, each of the magnet-receiving holes having a plurality of wall surfaces including a radially innermost wall surface which is positioned radially innermost among the plurality of wall surfaces; and
a plurality of magnets each of which is received in a corresponding one of the magnet-receiving holes of the rotor core,
wherein each of the magnets is arranged in the corresponding magnet-receiving hole so that among thermal resistances between the magnet and the plurality of wall surfaces of the corresponding magnet-receiving hole, the thermal resistance between the magnet and the radially innermost wall surface of the corresponding magnet-receiving hole is lowest,
wherein each of the magnets is retained by a corresponding retaining member in the corresponding magnet-receiving hole of the rotor core so as to abut the radially innermost wall surface of the corresponding magnet-receiving hole,
wherein for each of the magnets, the plurality of wall surfaces of the corresponding magnet-receiving hole of the rotor core also include two opposite wall surfaces which are respectively positioned on opposite circumferential sides of the radially innermost wall surface and both adjoin the radially innermost surface, and
the magnet is retained by the corresponding retaining member in the corresponding magnet-receiving hole so as to abut only one of the two opposite wall surfaces as well as the radially innermost wall surface of the corresponding magnet-receiving hole.

14. The rotor as set forth in claim 13, wherein the plurality of magnet-receiving holes are formed in pairs in the rotor core,
for each pair of the magnet-receiving holes, the two magnets which are respectively received in the two magnet-receiving holes of the pair are arranged so as to together form one magnetic pole of the rotor,
when viewed along an axial direction of the rotor core, the two magnets are symmetrically arranged and extend obliquely with respect to a centerline of the magnetic pole, the centerline extending in a radial direction of the rotor core to bisect the magnetic pole in a circumferential direction of the rotor core,
for each of the magnets, the plurality of wall surfaces of the corresponding magnet-receiving hole further include a wall surface that is positioned closest to the centerline among the plurality of wall surfaces and adjoins the radially innermost wall surface with a radially innermost corner portion formed therebetween, and
each of the magnets is retained by the corresponding retaining member in the corresponding magnet receiving hole so as to abut the radially innermost corner portion.

15. The rotor as set forth in claim 13, wherein the magnets are received in the corresponding magnet-receiving holes of the rotor core so that all of the relative positions of the magnets to the corresponding magnet-receiving holes are the same.

16. The rotor as set forth in claim 13, wherein each of the magnets has a side surface which faces the radially innermost wall surface of the corresponding magnet-receiving hole, and
at least 70% of the side surface abuts the radially innermost wall surface of the corresponding magnet-receiving hole.

17. A method of manufacturing the rotor as set forth in claim 13, the method comprising the steps of:
providing each of the magnets in the corresponding magnet-receiving hole of the rotor core; and
forming the corresponding retaining member for each of the magnets by filling a molten resin into the corresponding magnet-receiving hole and then solidifying the molting resin.

18. The method as set forth in claim 17, wherein for each of the magnets, the plurality of wall surfaces of the corresponding magnet-receiving hole further include a wall surface which is positioned opposite to the radially innermost wall surface and has a groove formed therein, and in the step of forming the corresponding retaining member for each of the magnets, the molten resin is filled into the corresponding magnet-receiving hole from the groove formed in the wall surface opposite to the radially innermost wall surface.

19. The method as set forth in claim 18, wherein for each of the magnets, the plurality of wall surfaces of the corresponding magnet-receiving hole also include two wall surfaces which are opposite to each other and both adjoin the radially innermost wall surface, and
in the step of forming the corresponding retaining member for each of the magnets, the molten resin is filled into the corresponding magnet-receiving hole from a void space formed between the permanent magnet and a radially outer one of the two wall surfaces adjoining the radially innermost wall surface as well as from the groove formed in the wall surface opposite to the radially innermost wall surface.

20. The method as set forth in claim 18, wherein in the step of forming the corresponding retaining member for each of the magnets, the molten resin is filled into the corresponding magnet-receiving hole with a fixing pin inserted in the groove so as to fix the magnet in abutment with the radially innermost wall surface of the corresponding magnet-receiving hole.

21. The method as set forth in claim 20, wherein the fixing pin has formed therein an injection gate for injecting the molten resin into the corresponding magnet-receiving hole.

22. The method as set forth in claim 17, wherein the step of providing each of the magnets in the corresponding magnet-receiving hole of the rotor core comprises the sub-steps of: inserting each of a plurality of magnet material blocks into a corresponding one of the magnet-receiving holes of the rotor core; and magnetizing each of the magnet material blocks to form one of the magnets.

23. The rotor as set forth in claim 13, wherein for each of the magnets, the corresponding retaining member is formed of a resin filled in the corresponding magnet-receiving hole of the rotor core.

\* \* \* \* \*